United States Patent
Shimizu et al.

(10) Patent No.: US 10,598,565 B2
(45) Date of Patent: Mar. 24, 2020

(54) DEFORMATION MODE ANALYSIS METHOD FOR MEMBER OF STRUCTURE, STRUCTURE REINFORCEMENT METHOD USING DEFORMATION MODE ANALYSIS METHOD, COMPUTER PROGRAM FOR DEFORMATION MODE ANALYSIS OF STRUCTURE, AND RECORDING MEDIUM

(71) Applicant: NIPPON STEEL & SUMITOMO METAL CORPORATION, Tokyo (JP)

(72) Inventors: Nobutaka Shimizu, Kimitsu (JP); Takeshi Kawachi, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 187 days.

(21) Appl. No.: 15/511,828

(22) PCT Filed: Sep. 17, 2015

(86) PCT No.: PCT/JP2015/076448
§ 371 (c)(1),
(2) Date: Mar. 16, 2017

(87) PCT Pub. No.: WO2016/043261
PCT Pub. Date: Mar. 24, 2016

(65) Prior Publication Data
US 2017/0293366 A1    Oct. 12, 2017

(30) Foreign Application Priority Data

Sep. 18, 2014 (JP) .................. 2014-190141

(51) Int. Cl.
*G01M 5/00* (2006.01)
*G06F 30/23* (2020.01)
*G06F 111/10* (2020.01)

(52) U.S. Cl.
CPC ........ *G01M 5/0041* (2013.01); *G01M 5/0091* (2013.01); *G06F 30/23* (2020.01); *G06F 2111/10* (2020.01)

(58) Field of Classification Search
CPC .... G06F 3/0325; G06F 17/50; G06F 17/5018; G06F 2217/16; G01M 5/0091;
(Continued)

(56) References Cited

U.S. PATENT DOCUMENTS 6,704,693 B1 * 3/2004 Fan .................. G06F 17/5018
703/1
6,876,956 B1 * 4/2005 Cirak .................. G06F 17/5018
703/1
(Continued)

FOREIGN PATENT DOCUMENTS

CN    1414194 A    4/2003
CN    101750017 A   6/2010
(Continued)

OTHER PUBLICATIONS

Robinson, J. "Structural Testing and Analysis of a Joined Wing Technology Demonstrator" Air Force Research Laboratory (2004) (Year: 2004).*
(Continued)

*Primary Examiner* — Jay Hann
(74) *Attorney, Agent, or Firm* — Birch, Stewart, Kolasch & Birch, LLP

(57) ABSTRACT

A deformation mode analysis method for a member of a structure is a method of analyzing a deformation mode of each member by performing structural analysis or a structural test on a structure including a single member or a plurality of members. In this method, the deformation mode
(Continued)

of the structure is analyzed by separating the structure into a plurality of regions and calculating deformations for every separated region.

23 Claims, 36 Drawing Sheets

(58) Field of Classification Search
CPC ........ G01M 5/0041; G01M 7/08; G01M 5/00; G01N 3/30; Y02T 10/82
See application file for complete search history.

(56) References Cited

U.S. PATENT DOCUMENTS

| | | | | |
|---|---|---|---|---|
| 6,901,809 | B2 * | 6/2005 | Dong | G06F 17/5018 73/789 |
| 9,026,406 | B2 * | 5/2015 | Das | B23P 17/00 703/1 |

FOREIGN PATENT DOCUMENTS

| | | | | |
|---|---|---|---|---|
| CN | 103630105 | A | * 3/2014 | ............. G02B 21/22 |
| JP | 2-159531 | A | 6/1990 | |
| JP | 2006-119005 | A | 5/2006 | |
| JP | 2008-15635 | A | 1/2008 | |
| JP | 2008015635 | A | * 1/2008 | |
| JP | 2011-164031 | A | 8/2011 | |
| JP | 2013-37437 | A | 2/2013 | |
| JP | 2013037437 | A | * 2/2013 | |
| JP | 2013-50814 | A | 3/2013 | |
| JP | 2013050814 | A | * 3/2013 | |

OTHER PUBLICATIONS

Gotluru, B.P., et al. "Torsion in Thin-Walled Cold-Formed Steel Beams" Thin-Walled Structures, vol. 37, pp. 127-145 (2000) (Year: 2000).*

International Search Report for PCT/JP2015/076448 dated Nov. 24, 2015.

Written Opinion of the International Searching Authority for PCT/JP2015/076448 (PCT/ISA/237) dated Nov. 24, 2015.

Chinese Office Action and Search Report for counterpart Chinese Application No. 201580049905.0, dated Oct. 21, 2019, with partial English translation.

* cited by examiner

ENTIRE COORDINATE SYTEM

MEMBER COORDINATE SYSTEM

ENTIRE COORDINATE SYTEM

MEMBER COORDINATE SYSTEM

ENTIRE COORDINATE SYTEM

MEMBER COORDINATE SYSTEM

4B: STANDARD SCALE

4A: STANDARD POINT

DEFORMATION MODE ANALYSIS METHOD FOR MEMBER OF STRUCTURE, STRUCTURE REINFORCEMENT METHOD USING DEFORMATION MODE ANALYSIS METHOD, COMPUTER PROGRAM FOR DEFORMATION MODE ANALYSIS OF STRUCTURE, AND RECORDING MEDIUM

TECHNICAL FIELD OF THE INVENTION

The present invention relates to a deformation mode analysis method for a member of a structure used in the fields of, for example, construction, home appliance, OA equipment (Office Automation equipment), furniture, household good, vehicle, railway, ship, and aircraft, a structure reinforcement method using a deformation mode analysis method, a computer program for deformation mode analysis of a structure, and a recording medium.

Priority is claimed on Japanese Patent Application No. 2014-190141, filed on Sep. 18, 2014, the content of which is incorporated herein by reference.

RELATED ART

In various fields such as construction, home appliance, OA equipment, furniture, household good, vehicle, railway, ship, and aircraft, there are needs for saving of materials and reduction in weight, and members (for example, frames or panels made of metal or resin) constituting these structures tend to become thin.

Here, if the member becomes thin, since rigidity of the member is deteriorated, there is a need for creation of a reasonable structure specification capable of suppressing a deterioration in rigidity with becoming thin. In order to find the structure specification for ensuring the rigidity, it is effective in precisely analyzing a deformation of the member that causes a deterioration in the rigidity, and an analysis technology for appropriately ascertaining a deformation mode of the structure is required.

For example, as a method of ascertaining such a deformation mode of the structure, there has been generally known a method of measuring displacements δX and δZ (mm) of the members in perpendicular directions of member axes of members 101 and 102 (transversal member 101 and a longitudinal member 102) in these members constituting a structure 100 shown in FIG. 32 and calculating deflection of the member when a load Px in an X-axis negative direction is applied to an end surface 102a of the longitudinal member 102. In such a general method, a method of roughly finding a deflection degree of the member constituting the structure 100 as represented in the deformation measurement result shown in FIGS. 33 and 34 has been performed. FIG. 33 shows the relationship between a deflection δX and a measurement location LZ (mm) of the longitudinal member 102, and FIG. 34 shows the relationship between a measurement location LX (mm) and a deflection δZ of the transversal member 101. Incidentally, in the method of ascertaining the deformation mode of the structure 100 shown in FIG. 32, there is a problem that it is difficult to analyze a deformation mode such as bending or torsion of the member 101 or 102.

In contrast, the method of analyzing the deformation mode of the structure is disclosed in, for example, Patent Documents 1 to 3.

Patent Document 1 discloses a method of calculating a local change of a deflection shape measured from beams having uniform cross sections in close contact with the structure by using second derivative or third derivative of a deflection curve, as a method of measuring a change in deflection shape of a structure in the measurement of a local change in shape.

Patent Document 2 discloses a vibration mode analysis method of an annular structure as a method of measuring a deformation mode such as distortion of a cross section of a structure. This method is a method of observing vibration information of the cross section of the annular structure in a plurality of locations in an annular direction, specifying nodes or antinodes of the vibration from changes in the vibration information at the respective observation points, and calculating a vibration order of the annular structure.

Patent Document 3 discloses a measurement method of a location of a structure through photographic measurement. Such a method is effective in checking dimensional accuracy of a large-scaled structure.

PRIOR ART DOCUMENT

Patent Document

[Patent Document 1] Japanese Unexamined Patent Application, First Publication No. H2-159531
[Patent Document 2] Japanese Unexamined Patent Application, First Publication No. 2011-164031
[Patent Document 3] Japanese Unexamined Patent Application, First Publication No. 2006-119005

DISCLOSURE OF THE INVENTION

Problems to be Solved by the Invention

However, in the method of analyzing the deformation mode of the structure of the related art, the method of Patent Document 1 is effective in ascertaining a change degree of curvature and a unidirectional bending deformation of the structure, but there is a problem that it is difficult to analyze a deformation mode of a complicated three-dimensional structure in which bidirectional bending or torsion is coupled. Since the deflections are measured in the beams having uniform cross sections in close contact with the structure, measurement values are greatly influenced by deformation such as local deflection of the cross sections or local damage on installation surfaces of the beams having uniform cross sections. Thus, there is a concern that it is difficult to precisely evaluate deformation over the entire length of the member constituting the structure.

The method of Patent Document 2 is effective in ascertaining a cross section order of a vibration mode of the annular structure, but there is a concern that it is difficult to extract a three-dimensional deformation mode such as bending or torsion of the member constituting the structure.

Patent Document 3 does not cope with the analysis of the deformation mode of the member constituting the structure, and thus, there is still room for improvement.

The present invention has been made in view of the above-described problems, and it is an object of the present invention to provide a deformation mode analysis method for a member of a structure, a structure reinforcement method using a deformation mode analysis method, a computer program for deformation mode analysis of a structure, and a recording medium, which are capable of analyzing a complicated deformation in which the bending or torsion generated in the member constituting the structure is coupled.

Means for Solving the Problem

In order to solve the problems and in order to achieve the object, the present invention has adopted the following aspects.

(1) A deformation mode analysis method according to an aspect of the present invention is a deformation mode analysis method for a member of a structure of analyzing a deformation mode of a member by performing structural analysis or a structural test on a structure including a single member or a plurality of members. The method includes: analyzing the deformation mode of the structure by separating the structure into a plurality of regions and calculating deformations for every separated region.

According to the deformation mode analysis method for a member of a structure described above, it is possible to acquire a desired specification of the structure by evaluating the deformation mode of the structure, extracting a portion (reinforcement portion) having a large contribution and a reinforcement method, and reinforcing the structure.

(2) The deformation mode analysis method for a member of a structure according to (1) described above may further include: setting an outline on a member cross section of the member before deformation from a result of the structural analysis or the structural test, setting an arbitrary first point in the outline and a second point which is different from the first point and is located on a displacement extraction surface including the member cross section, as displacement extraction points, and extracting coordinates of the first and second points before and after the member is deformed; calculating vectors using the first point and the second point before and after the member is deformed; calculating displacements of the first point and the second point before and after the deformation and angles formed by the vectors before and after the deformation; calculating a translational displacement and a rotation angle as the member cross section from the displacements and the angles; and calculating change amounts of the translational displacements and change amounts of the rotation angles as the member cross section with respect to a member axial direction of the member.

In this case, before and after the member is deformed, since the coordinates of the arbitrary first point in the outline and the second point located on the displacement extraction surface including the member cross section before and after the member is deformed can be extracted, the vectors using the first point and the second point before and after the member is deformed can be calculated, the displacements of the first point and the second point before and after the deformation and the angles formed by the vectors before and after the deformation can be calculated, the translational displacements and the rotation angles as the member cross section can be calculated from the displacements and the angles, and the change amounts of the translational displacements and the change amounts of the rotation angles as the member cross section with respect to the member axial direction of the member can be calculated, it is possible to quantitatively analyze the deformation mode of the complicated structure based on the three-dimensional deformation amount in which the bidirectional bending or torsion of the member constituting the structure is coupled.

Thus, it is possible to precisely evaluate the deformation over the entire length of the member constituting the structure. A portion and a deformation state acting as weakness in ensuring rigidity of the structure are recognized based on the analysis result of the deformation modes, and thus, it is possible to efficiently find a structure specification for ensuring the rigidity.

(3) In the deformation mode analysis method for a member of a structure according to (2) described above, the vector may be a vector acquired by connecting two points in the outline, or a vector acquired by connecting two points including one point in the outline and one point out of the outline within the displacement extraction surface including the member cross section.

(4) In the deformation mode analysis method for a member of a structure according to (2) described above, a plurality of triangular elements each having two points in the outline and a point out of the outline within a plane including the member cross section, as vertices of the triangular elements may be determined on the member cross section, displacements as the triangular elements may be calculated from coordinates of the respective vertices of the triangular elements before and after the deformation and rotation angles as the triangular elements may be calculated from angles formed by the vectors calculated using the respective vertices of the triangular elements for the vectors before and after the deformation, and translational displacements and rotation angles as the member cross section may be calculated as an average of the displacements of the plurality of triangular elements and an average of the rotation angles of the plurality of triangular elements.

In this case, in addition to the above-described effects and advantages, it is possible to reduce an error when a local deformation in which the cross section of the member constituting the structure is distorted influences on the evaluation values of the displacements and the rotation angles as the cross section, and thus, it is possible to improve precision of the deformation mode analysis for the three-dimensional deformation in which the bending or the torsion is coupled.

(5) The deformation mode analysis method for a member of a structure according to (1) described above may further include: setting an outline on a member cross section of the member before deformation from a result of the structural analysis or the structural test, setting an arbitrary first point in the outline and a second point which is different from the first point and is located on a displacement extraction surface including the member cross section, as displacement extraction points, and extracting coordinates of the first and second points before and after the member is deformed; calculating vectors in a normal direction with respect to surface elements on the member cross section including the first point and the second point before and after the member is deformed; calculating displacements of the first point and the second point before and after the deformation and angles formed by the vectors in the normal direction before and after the deformation; calculating translational displacements and rotation angles as the member cross section from the displacements and the angles; and calculating change amounts of the translational displacements and the rotation angles as the member cross section with respect to a member axial direction of the member.

(6) In the deformation mode analysis method for a member of a structure according to (5) described above, a plurality of triangular elements each having two points in the outline, a point out of the outline within a plane including the member cross section, as vertices of the triangular elements may be determined on the member cross section, displacements as the triangular elements may be calculated from coordinates of the respective vertices of the triangular elements before and after the deformation and rotation angles as the triangular elements may be calculated from angles formed by the vectors in the normal direction with respect to the respective surfaces of the triangular elements for the vectors before and after the deformation, and translational displacements and rotation angles as the member cross section may be calculated as an average of the displacements of the plurality of triangular elements and an average of the rotation angles of the plurality of triangular elements.

(7) In the deformation mode analysis method for a member of a structure according to (4) or (6) described above, the translational displacement and the rotation angle as the member cross section may be calculated as averages of values acquired by multiplying a weighting factor depending on an area of the triangular element.

In this case, the translational displacements and the rotation angles as the member cross section are calculated as the averages of the values acquired by multiplying the weighting factor depending on the area of the triangular element, and thus, it is possible to improve evaluation precision of the translational displacements and the rotation angles as the member cross section in a case where there are a coarse region and a dense area in the arrangement of the panel points on the member cross section. Accordingly, it is possible to improve precision of the deformation mode analysis of the structure.

(8) In the deformation mode analysis method for a member of a structure according to any one of (2) to (7), the point out of the outline within the plane including the member cross section may be a centroid, a center of gravity, or a shear center on the member cross section.

In this case, it is possible to improve evaluation precision of the translational displacements and the rotation angles as the member cross section with respect to the centroid, the center of gravity, or the shear center on the cross section of the member, and thus, it is possible to improve precision of the deformation mode analysis of the structure.

(9) In the deformation mode analysis method for a member of a structure according to any one of (2) to (8) described above, the translational displacement as the member cross section may be calculated from an average of the displacements before and after the deformation, and the rotation angle as the member cross section may be calculated from an average of the angles before and after the deformation.

In this case, it is possible to analyze the deformation mode of the structure on a complicated three-dimensional deformation behavior in which the bending or torsion generated in the member is coupled based on the translational displacements of the points on the cross section of the member constituting the structure.

(10) In the deformation mode analysis method for a member of a structure according to any one of (2) to (9) described above, when the translational displacement as the member cross section is calculated from an average of the displacements before and after the deformation, a value of at least one displacement deviated from the average may be excluded.

(11) In the deformation mode analysis method for a member of a structure according to any one of (2) to (9) described above, when the rotation angle as the member cross section is calculated based on an average of the angles before and after the member is deformed, a value of at least one angle deviated from the average may be excluded.

In this case, when the translational displacements or the rotation angles as the member cross section are calculated, a value of at least one displacement or angle deviated from the average is excluded, and thus, it is possible to improve evaluation precision of the translational displacements or the rotation angles as the member cross section in a case where the cross section is distorted due to the local deformation. Accordingly, it is possible to improve precision of the deformation mode analysis of the structure.

(12) In the deformation mode analysis method for a member of a structure according to any one of (2) to (6) and (8) to (11) described above, the translational displacements and the rotation angles as the member cross section may be calculated as averages of values acquired by multiplying a weighting factor depending on a length of a vector acquired by connecting two points on the member cross section.

In this case, the translational displacements and the rotation angles as the member cross section are calculated as the averages of the values acquired by multiplying the weighting factor depending on the length of the vector, and thus, it is possible to improve evaluation precision of the translational displacements and the rotation angles as the member cross section in a case where there are a coarse region and a dense area in the arrangement of the panel points on the member cross section. Accordingly, it is possible to improve precision of the deformation mode analysis of the structure.

(13) In the deformation mode analysis method for a member of a structure according to any one of (2) to (12) described above, in the performing of the structural analysis on the structure and extracting the coordinates of the points on the member cross section before and after the deformation, the translational displacements and the rotation angles of the member may be evaluated based on coordinates of intersection points of element boundary lines with the displacement extraction surface in a finite element method analysis model.

In this case, the displacements of the member are evaluated based on the coordinates of the intersection points of the element boundary lines with the displacement extraction surface in the finite element method analysis model, and thus, it is possible to easily extract the translational displacements and the rotation angles as the cross section of the member having a complicated cross section. Accordingly, it is possible to quantitatively evaluate the deformation mode of the structure in a numerical simulation stage before testing.

(14) In the deformation mode analysis method for a member of a structure according to any one of (2) to (15) described above, in the performing of the structural test on the structure and extracting the coordinates of the points on the member cross section before and after the deformation, the translational displacements and the rotation angles of the member may be evaluated based on coordinates acquired through photographic measurement.

In this case, the displacements of the member are evaluated through the photographic measurement, and thus, it is possible to easily extract the translation displacements and the rotation angles as the member cross section having a complicated cross-section shape. Accordingly, it is possible to quantitatively evaluate the deformation mode of the structure in only a testing stage or a previously developed stage.

(15) Another aspect of the present invention is a deformation mode analysis method for a member of a structure of calculating a contribution of a deformation for a region of a member and a connection of the structure or for each region classified as the member or the connection by using the deformation mode analysis method for a member of a structure according to any one of (1) to (14) described above.

(16) Still another aspect of the present invention is a structure reinforcement method using the deformation mode analysis method for a member of a structure according to any one of (1) to (15) described above including evaluating the deformation mode of the structure so that a region having a large contribution is suppressed.

(17) Still another aspect of the present invention is a computer program for deformation mode analysis of a structure causing a computer to function as the respective processes of the deformation mode analysis method for a member of a structure according to any one of (1) to (15) described above and to analyze a deformation mode of the structure including the member.

(18) Still another aspect of the present invention is a recording medium that records the computer program for deformation mode analysis according to (17) so as to be readable by a computer.

Effects of the Invention

According to the deformation mode analysis method for the member of the structure, the structure reinforcement method using the deformation mode analysis method, the computer program for the deformation mode analysis of the structure, and the recording medium according to the respective aspects of the present invention, it is possible to analyze a complicated deformation in which the bending or torsion generated in the member constituting the structure is coupled, and it is possible to provide an effective reinforcement method depending on the deformation mode.

EMBODIMENTS OF THE INVENTION

Hereinafter, a deformation mode analysis method for a member of a structure, a structure reinforcement method using a deformation mode analysis method, a computer program for deformation mode analysis of a structure, and a recording medium according to the respective embodiments of the present invention will be described with reference to the drawings.

First Embodiment

Figure 1:
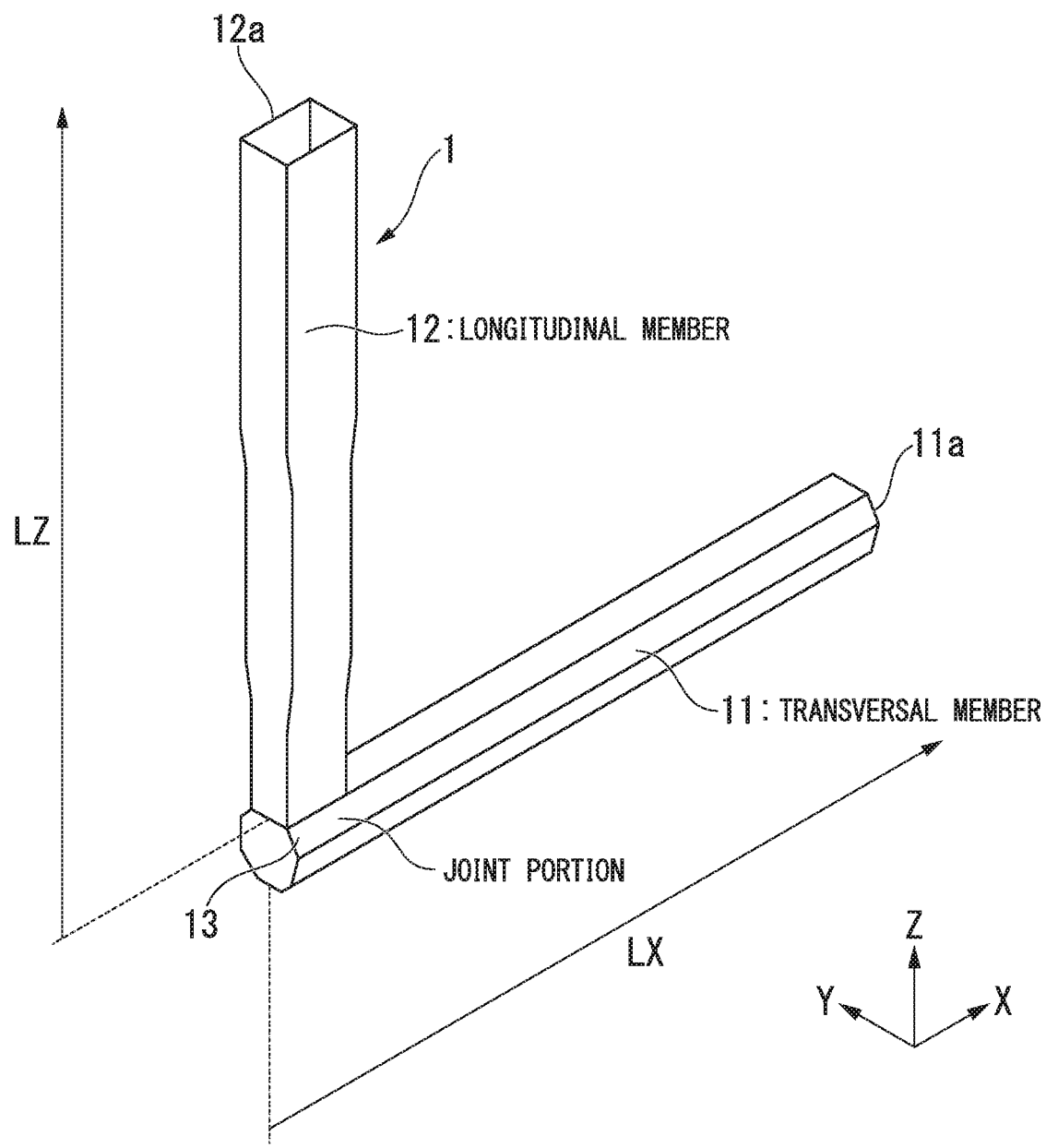
FIG. 1 is a perspective view showing a configuration of a structure applied to a deformation mode analysis method according to a first embodiment of the present invention.

In the present embodiment, as shown in FIG. 1, a deformation mode analysis method of analyzing a deformation mode of an L-shaped structure 1 including a transversal member 11 (having a length of LX) having a hexagonal cross section and a longitudinal member 12 in a case where the structure 1 acquired by connecting the member 11 to the member 12 (having a length of LZ) having a rectangular cross section through a joint portion 13 is deformed due to a load will be described.

It is assumed that a member axial direction of the transversal member 11 is an X axis, a member axial direction of the longitudinal member 12 is a Z axis, and a direction in which the X axis and the Z axis are perpendicular to each other is a Y axis. It is assumed that a direction opposite to an approach of the joint portion 13 to the transversal member 11 on the X axis is a positive direction, the approach of the joint portion 13 to the transversal member is a negative direction, an approach to a depth direction of a paper surface of FIG. 2 on the Y axis is a positive direction, and an opposite direction thereto is a negative direction.

Figure 2:
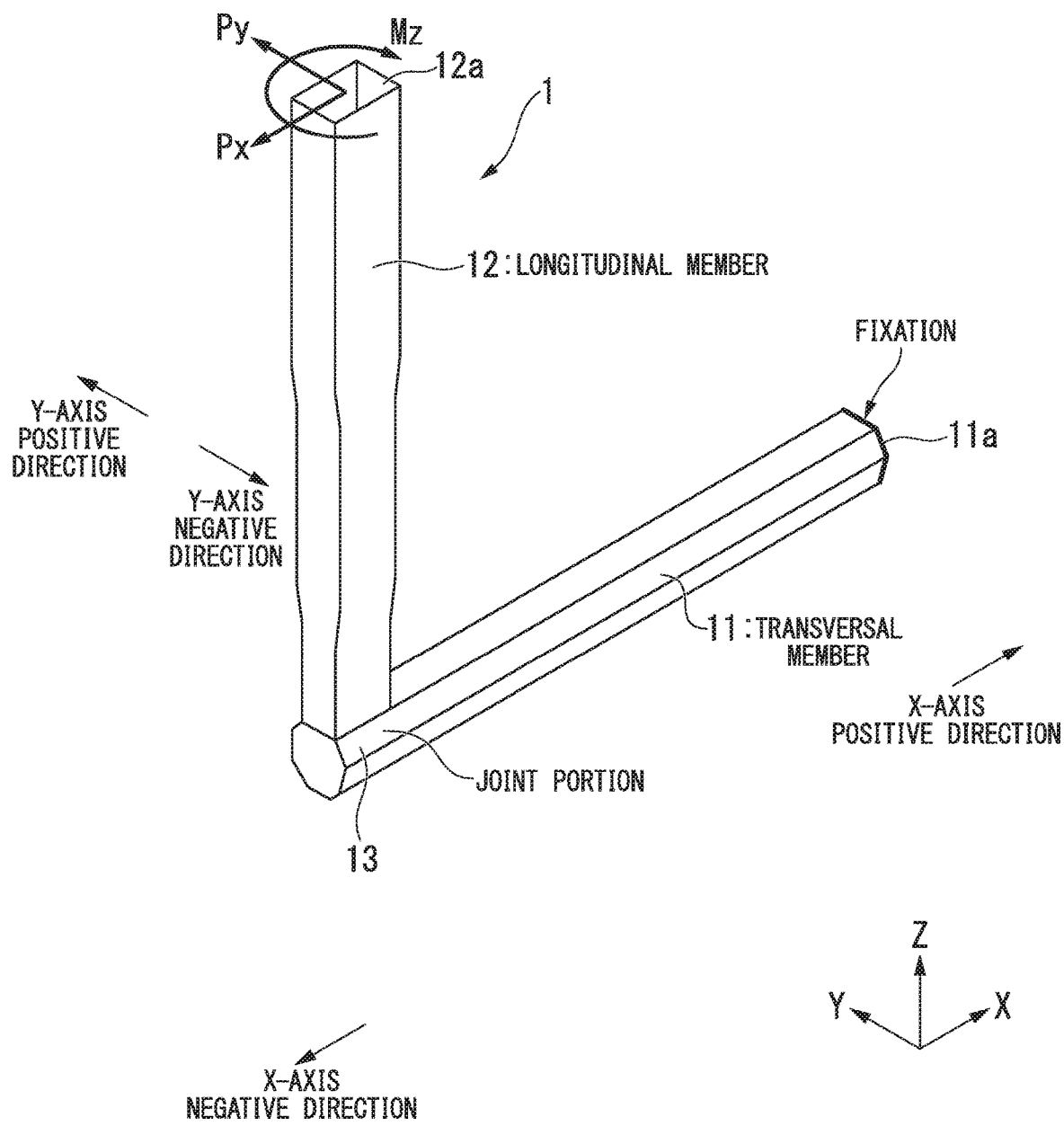
FIG. 2 is a diagram showing a support condition and a load applied to the structure shown in FIG. 1.

Here, as shown in FIG. 2, the deformation mode analysis method of the structure in a case where a load Px in the X-axis negative direction, a load Py in the Y-axis positive direction, and a torsional load Mz around the Z axis are independently applied to a tip end surface 12a of the longitudinal member 12 on the Z axis in a state in which an end surface (fixation end 11a) of the transversal member 11 in the X-axis positive direction is fixed will be described.

The entire shape of the structure 1 as a target is not limited to the L shape, and a partial structure may be acquired by removing a part of the entire structure including a plurality of members. A boundary condition (support condition or load condition) in a case where such a partial structure is examined may be determined based on a movement of the partial structure in the entire structure.

Figure 3:
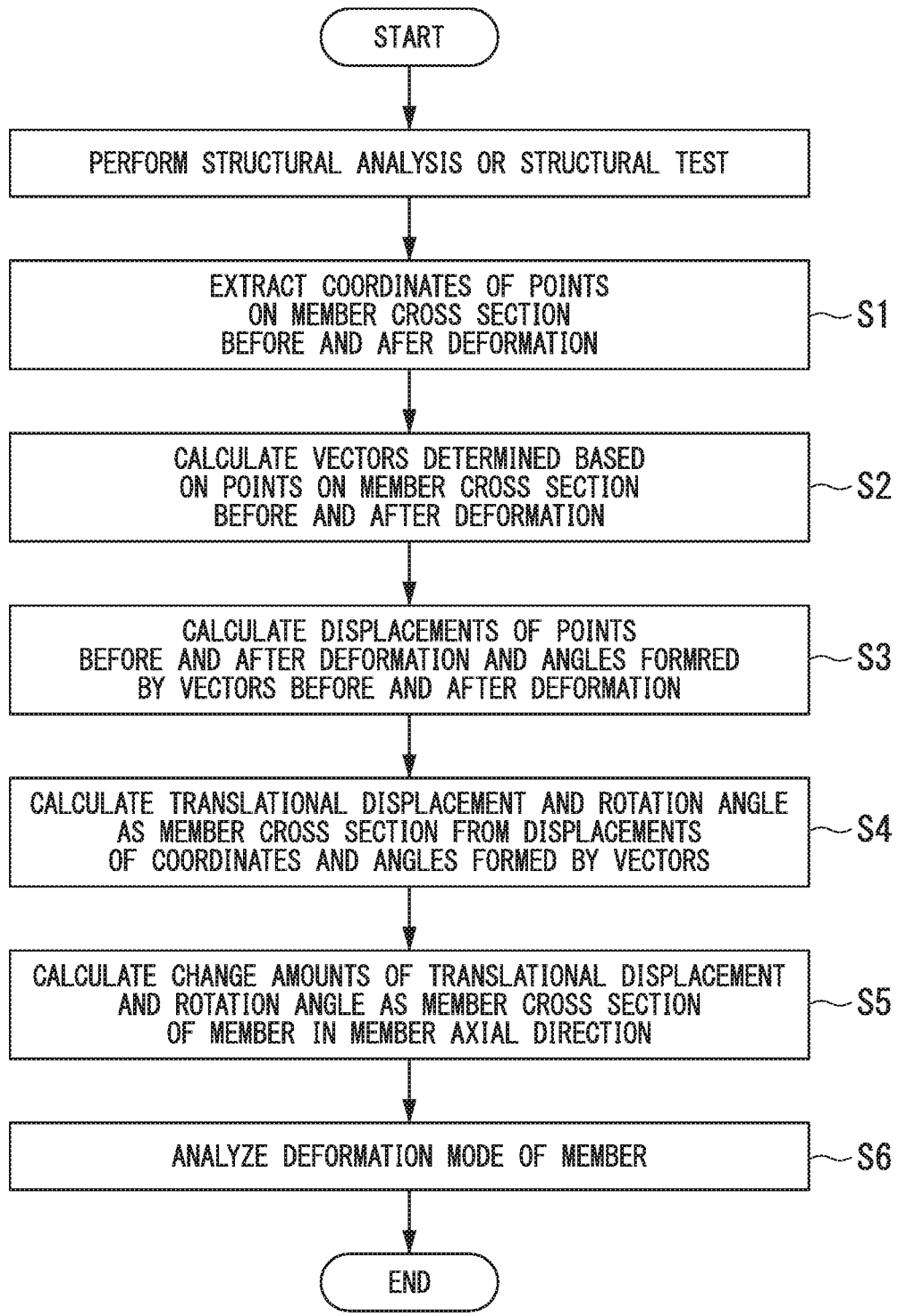
FIG. 3 is a flowchart of a deformation mode analysis method for a structure.

The deformation mode analysis method of the structure according to the present embodiment corresponds to a case where structural analysis of the flow of the deformation mode analysis method shown in FIG. 3 is performed, and evaluates deformation characteristics of the structure 1 including the transversal member 11 and the longitudinal member 12.

A specific deformation mode analysis method of the structure includes a process (first step S1) of setting an outline of a cross section of an undeformed member cross section from the result of the structural analysis, setting an arbitrary first point in the outline and a second point which is different from the first point and is located on a displacement extraction surface including the member cross section, as a displacement extraction point, and extracting coordinates of the first point and the second point before and after the deformation of the member, a process (second step S2) of calculating vectors using the first point and the second point before and after the deformation of the member, a process (third step S3) of calculating displacements of the first point and the second point before and after the deformation and angles formed by the vectors before and after the deformation, a process (fourth step S4) of calculating translational displacements and rotation angles as the member cross section from the displacements and the angles, a process (fifth step S5) of calculating change amounts of the translational displacements and change amounts of the rotation angles as the member cross section with respect to the member axial direction of the member, and a process (sixth step S6) of analyzing the deformation mode of the member from the change amounts of the translational displacements and the rotation angles as the member cross section.

Here, the relation of the deformation mode analysis flow shown in FIG. 3 with a structural analysis device 2 shown in FIG. 4 in a case where the structural analysis is performed will be described.

Figure 4:
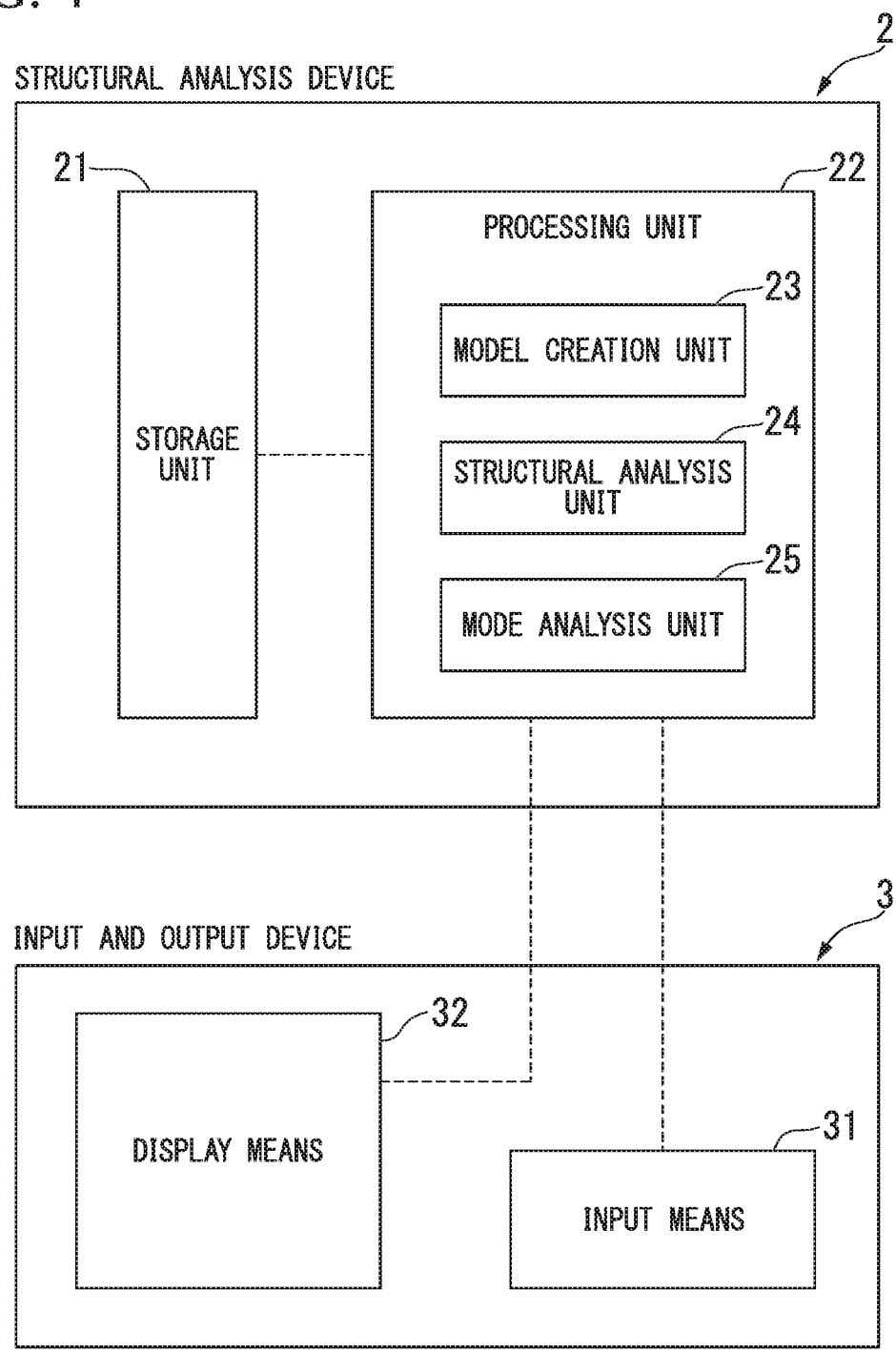
FIG. 4 is a diagram showing a schematic configuration of a structural analysis device and an input and output device for performing the deformation mode analysis method.

As shown in FIG. 4, the structural analysis device 2 is a computer that performs the deformation mode analysis method of the structure 1 shown in FIG. 1, and includes a storage unit 21 and a processing unit 22.

The storage unit 21 of the structural analysis device 2 stores a computer program capable of realizing the deformation mode analysis method of the structure 1, other computer programs, or analysis data.

As the storage unit 21, a hard disk, a magneto-optical disk, a flash memory, a random access memory (RAM), or a combination thereof may be used.

The processing unit 22 of the structural analysis device 2 includes a model creation unit 23, a structural analysis unit 24, and a mode analysis unit 25.

The model creation unit 23 creates an analysis model of the structure 1 offered for the structural analysis, and stores the generated analysis model in the storage unit 21. As the analysis model, a finite element method analysis model 10 (see FIG. 5) may be used. The structural analysis unit 24 performs the structural analysis using the finite element method analysis model 10.

The analysis method is not limited to such a finite element method analysis model 10, and a boundary element method model or a finite difference method model may be used. In this case, a boundary element method or a finite difference method is used as an analysis method.

The mode analysis unit 25 performs the respective procedures of steps S1 to S6 of FIG. 3, analyzes the result of the structural analysis, and performs the analysis of the deformation mode of the structure 1.

An input and output device 3 that includes input means 31 and display means 32 is connected to the structural analysis device 2. An input device such as a keyboard or a mouse may be used as the input means 31. In addition to a monitor such as a liquid crystal display, a printer device may also be used as the display means 32. By using the input means 31, the analysis model 10 is created by outputting an instruction to the model creation unit 23, and the structural analysis is performed by outputting an instruction to the structural analysis unit 24. The mode analysis unit 25 may analyze the structural analysis, and may analyze the deformation mode of the member constituting the structure 1. The analysis model 10, data of the structural analysis result, or data of the deformation mode analysis may be recorded in the storage unit 21, and data recorded in the storage unit 21 may be read through the processing unit 22 and may be output to the display means 32.

The computer program capable of realizing the deformation mode analysis method according to the present embodiment may realize the deformation mode analysis method by combining computer programs already stored in a computer system.

The computer program may be recorded in a computer-readable storage medium, and may be read into and may be performed in the computer. The computer system includes an operating system (OS) or hardware such as a peripheral device.

Hereinafter, an example in which the deformation mode of the structure 1 constituted by the member is analyzed by the structural analysis device 2 shown in FIG. 4 by using finite element method analysis according to the deformation mode analysis flow shown in FIG. 3 will be described.

Figure 5:
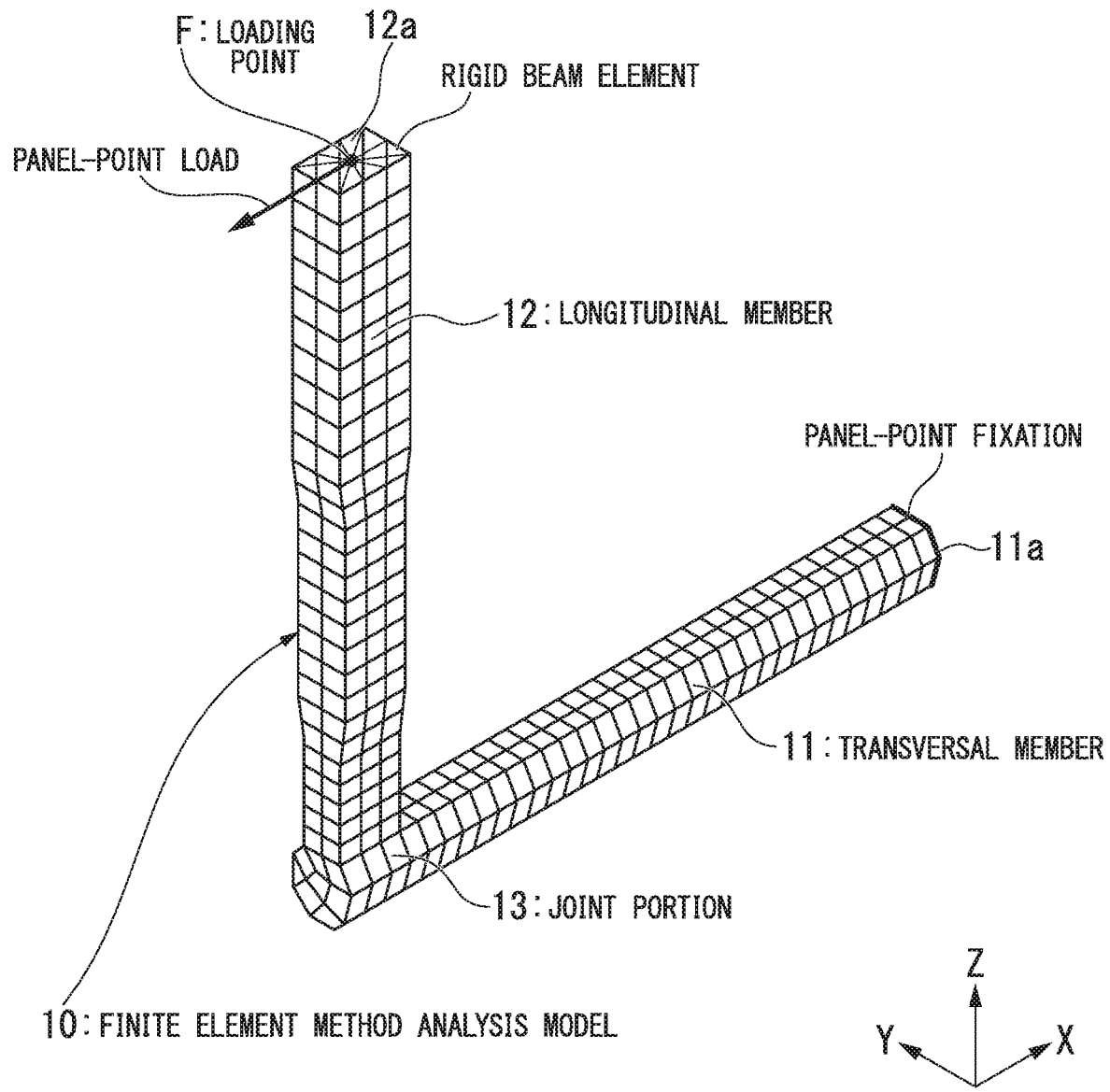
FIG. 5 is a diagram showing a finite element method analysis model of the structure shown in FIG. 2 created in the structural analysis device.

In the present embodiment, the deformation mode of the structure 1 is analyzed based on the finite element method analysis model 10 shown in FIG. 5 in a deformation state in a case where any one of the loads Px, Py, and Mz shown in FIG. 2 is applied to the L-shaped structure 1 shown in FIG. 1.

Here, XYZ shown in FIGS. 2, 5, and 7 to 12B represent the entire coordinate system. As shown in FIG. 5, the load Px in the X-axis negative direction, the load Py in the Y-axis positive direction, and the torsional load Mz around the Z axis are independently applied to the end surface (tip end surface 12a) of the longitudinal member 12 in the Z-axis positive direction under the support condition in which the degrees of freedom of a panel point of the finite element method analysis model 10 of the structure 1 are fixed on the end surface (fixation end 11a) of the transversal member 11 in the X-axis positive direction. Here, a panel point connected to the cross section of the member which is a rigid element is formed on the end surface (tip end surface 12a) of the longitudinal member 12 in the Z-axis positive direction, and this point is used as a loading point F that applies a load.

Initially, the first step S1 will be described.

Figure 6:
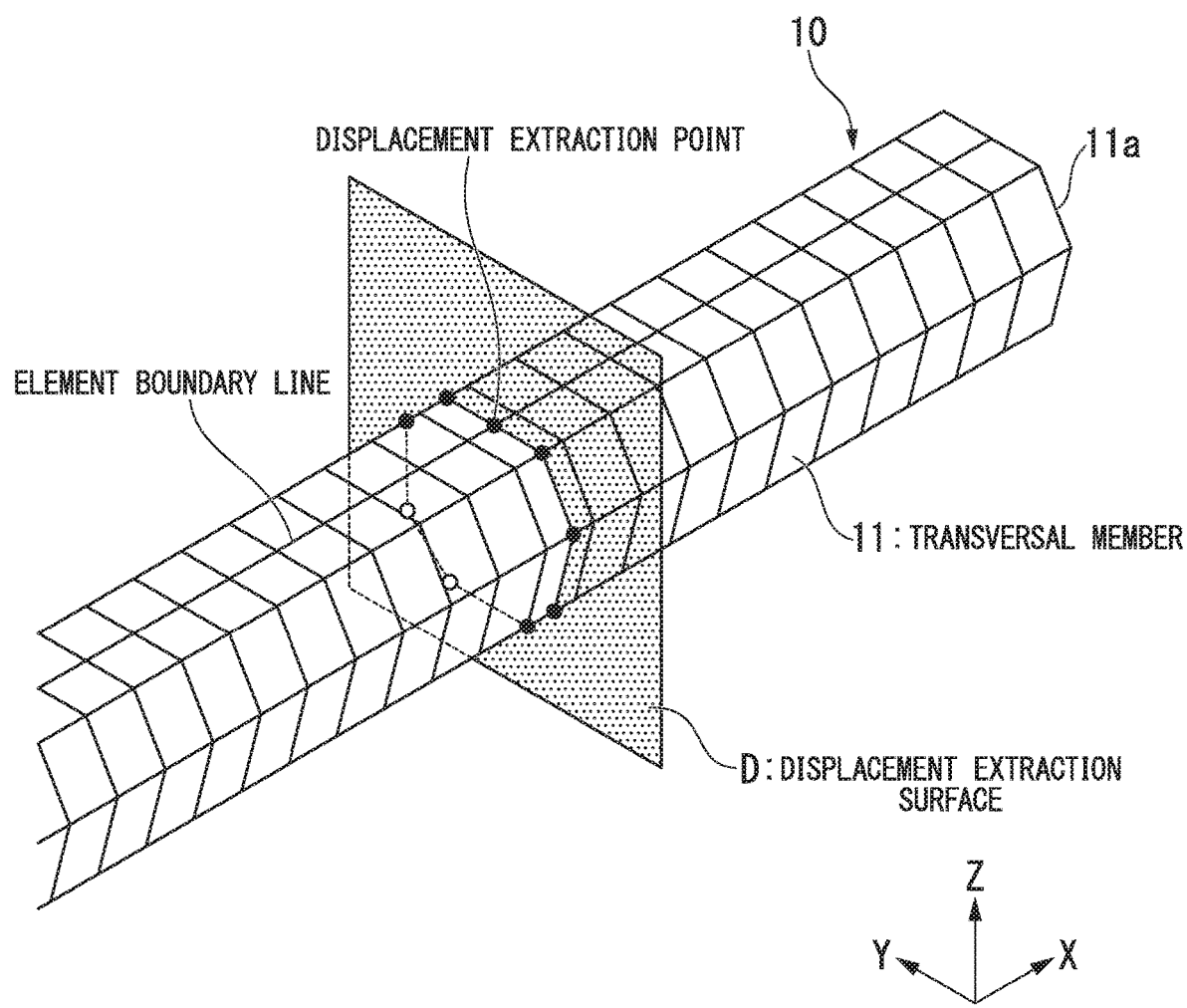
FIG. 6 is a diagram for describing steps for setting coordinates of points on a displacement extraction surface before and after the structure is deformed.

As shown in FIG. 6, coordinates of the displacement extraction point of the transversal member 11 on the cross section may be extracted as coordinates of intersection points of element boundary lines in the finite element analysis method model 10 with a displacement extraction surface D (plane including the member cross section) which is approximately perpendicular to the member axial direction of the transversal member 11 in the analysis model. Although it has been described in FIG. 6 that an element constituting the transversal member 11 is a quadrangular element, the shape of the element may be another shape such as a triangle. FIG. 6 shows an example of a shell element, but may be a solid element. In this case, a displacement may be extracted based on coordinates of intersection points of element boundary lines on a surface such as a front surface, a rear surface, or an intermediate surface between the front and rear surfaces of a solid element with a displacement extraction surface. In a case where a distance between the extracted point and an adjacent point is short, a plurality of points may be aggregated as one point.

Figure 7:
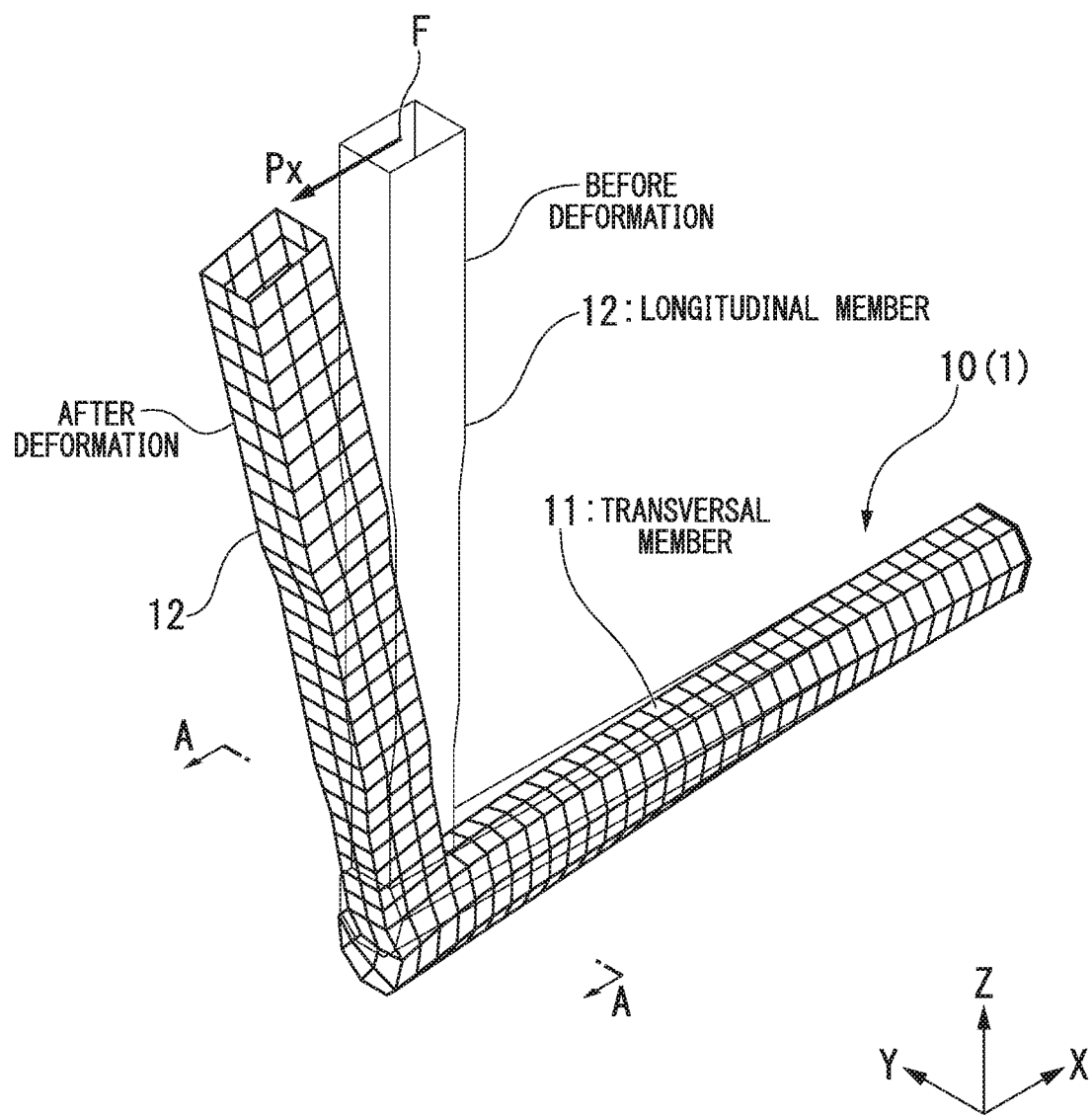
FIG. 7 is a perspective view of an analysis model showing a deformation state of an L-shaped structure in a case where a load Px in an X-axis negative direction is applied.
Figure 8:
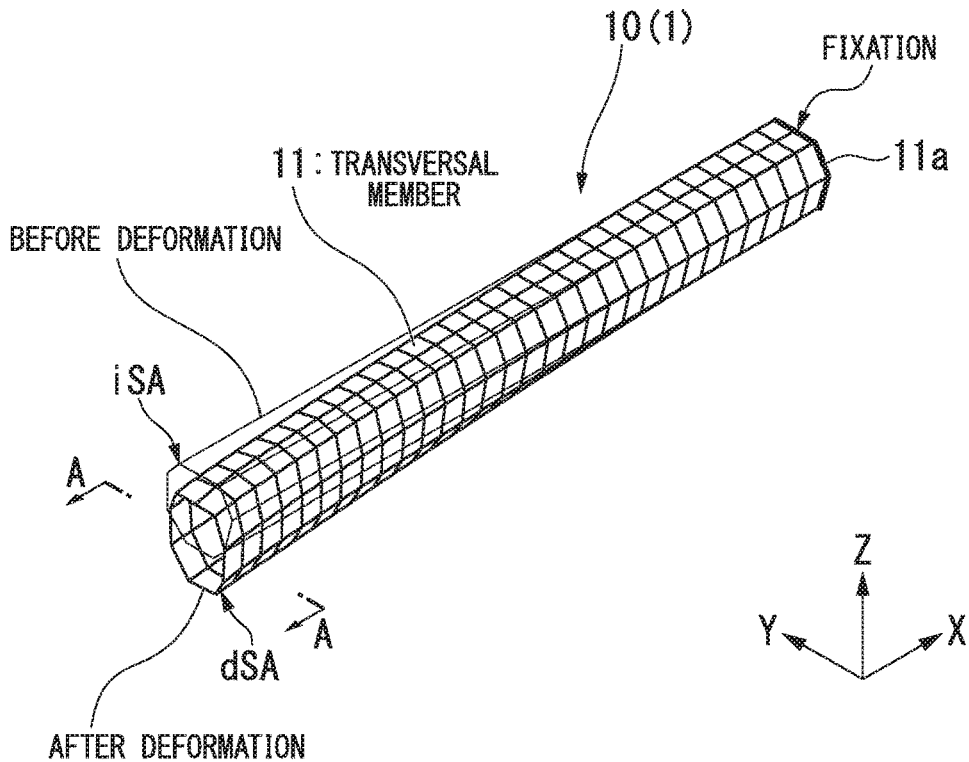
FIG. 8 is a cross-sectional view taken along line A-A shown in FIG. 7 to show a deformation state of a state in which a transversal member is cut along line A-A.
Figure 9:
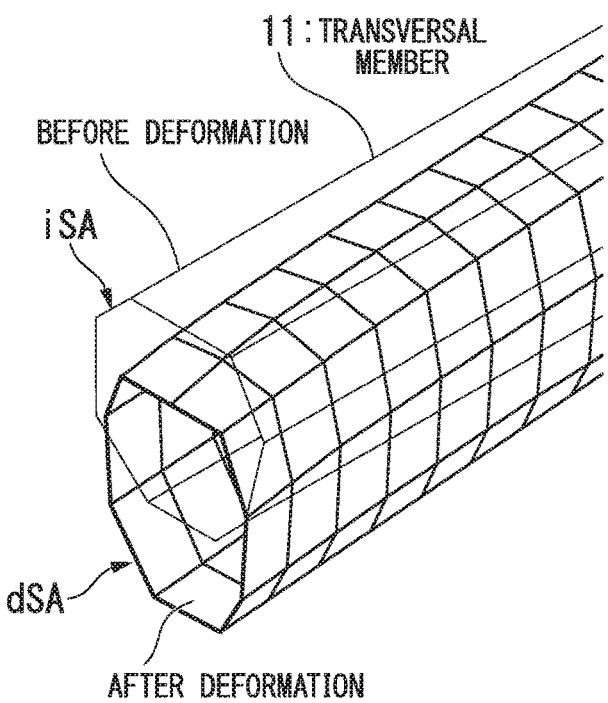
FIG. 9 is an enlarged view of major parts in a cut portion shown in FIG. 8.

FIG. 7 shows a deformation state of the L-shaped structure 1 in a case where the load Px in the negative direction of the X axis is applied at the loading point F of the longitudinal member 12. As shown in FIG. 7, bending deformation around the Y axis primarily occurs in the longitudinal member 12 and the transversal member 11. As shown in FIGS. 8 and 9, an undeformed cross section iSA is changed to a deformed cross section dSA while accompanying the rotation of the cross section around the Y axis and the displacement of the cross section in a Z-axis direction. In this case, the undeformed cross section iSA is changed to the deformed cross section dSA while accompanying deformation in which the cross section extending in the Z-axis direction and contracting in a Y-axis direction is distorted.

Figure 10:
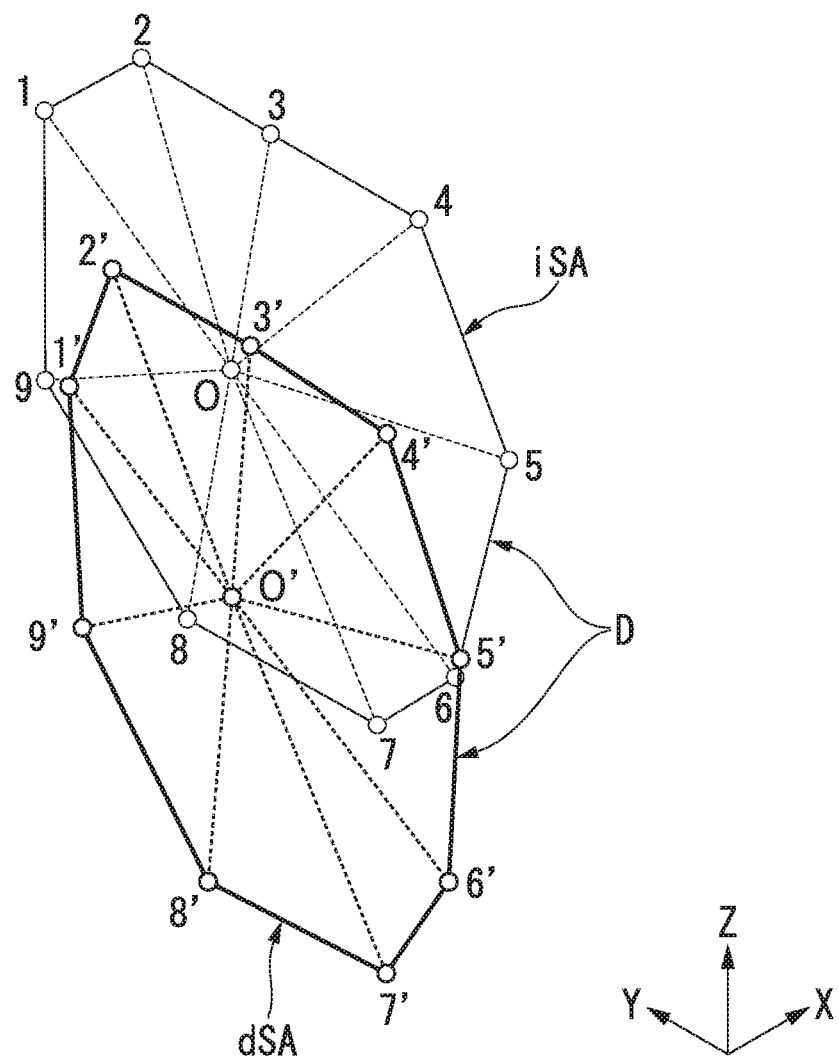
FIG. 10 is a diagram showing points on the displacement extraction surface before and after the deformation defined in a first step.

Subsequently, a point k on the undeformed cross section iSA and a point k' on the deformed cross section dSA are respectively defined as (Xk, Yk, Zk) and (Xk', Yk', Zk') by extracting coordinates (first point and second point) of the points on the undeformed cross section iSA and the deformed cross section dSA and using k=1, 2, . . . , and n as shown in FIG. 10.

A centroid of the undeformed cross section iSA and a centroid of the deformed cross section dSA are respectively determined as a point O and a point O', as points out of the outline within the displacement extraction surface D. These centroids O and O' are equivalent to the second points (displacement extraction points) which are different from the first points and are located on the displacement extraction surface including the member cross section.

Subsequently, in the second step S2, the vectors using the first points and the second points are calculated before and after the deformation of the member.

Figure 11A:
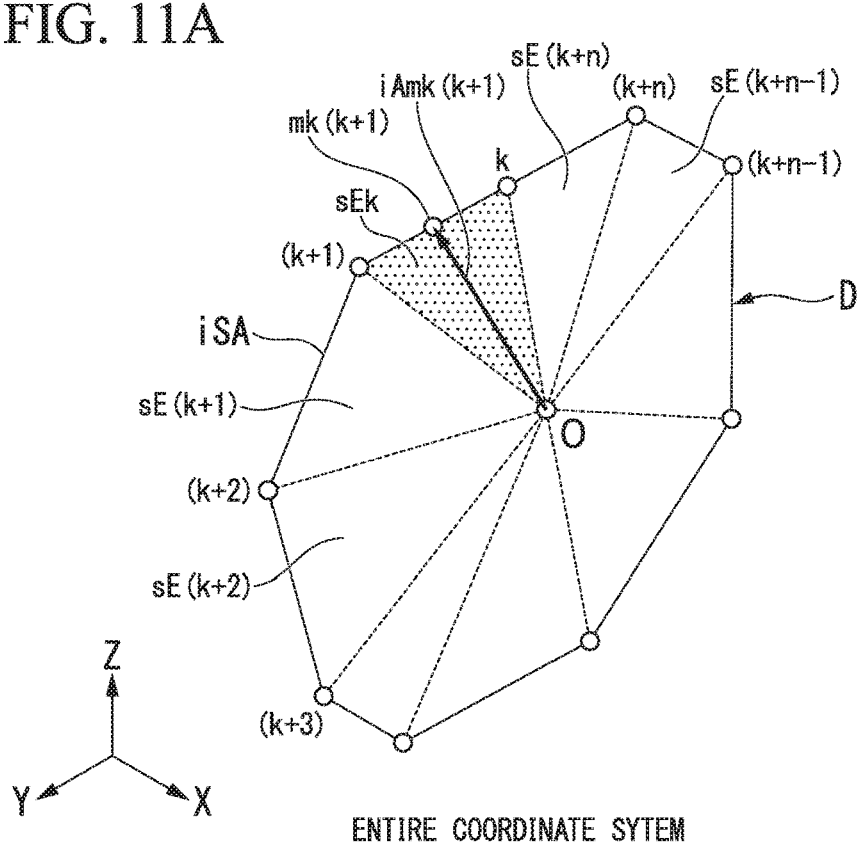
FIG. 11A is a diagram for describing a method of setting vectors on an undeformed cross section in a second step to show the entire coordinate system.
Figure 11B:
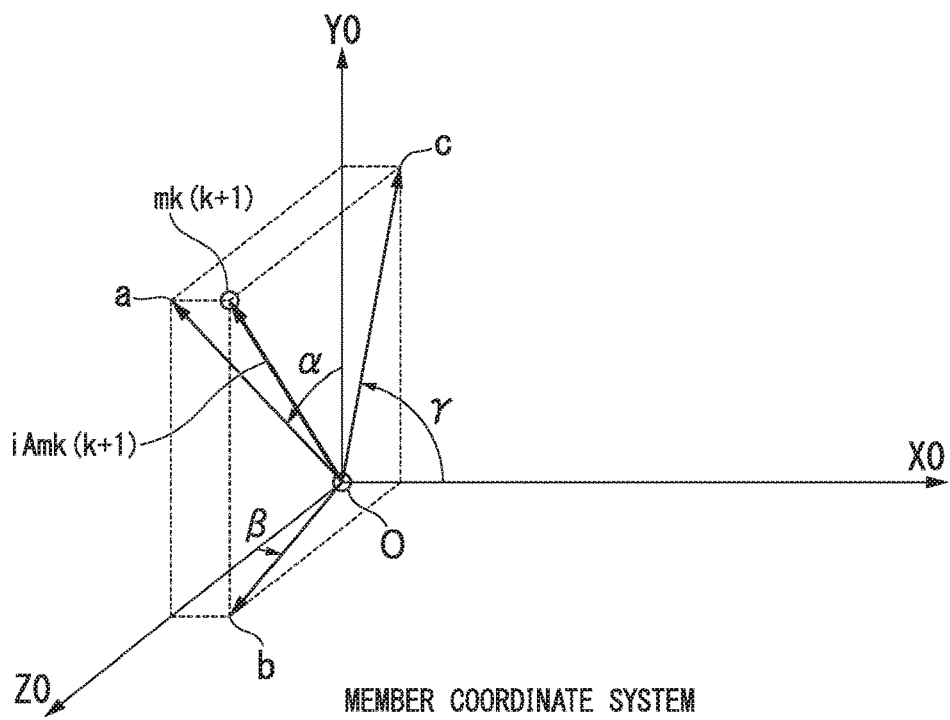
FIG. 11B is a diagram for describing the method of setting the vectors on the undeformed cross section in the second step to show a member coordinate system.

Specifically, as shown in FIGS. 11A and 11B, the cross section of the member is divided as a triangular element sEk (k=1, 2, . . . , and n) having two arbitrary points (point k and point k+1) in the outline of the undeformed cross section iSA and the centroid O out of the outline within the displacement extraction surface D, as vertices of the triangular elements.

Figure 12A:
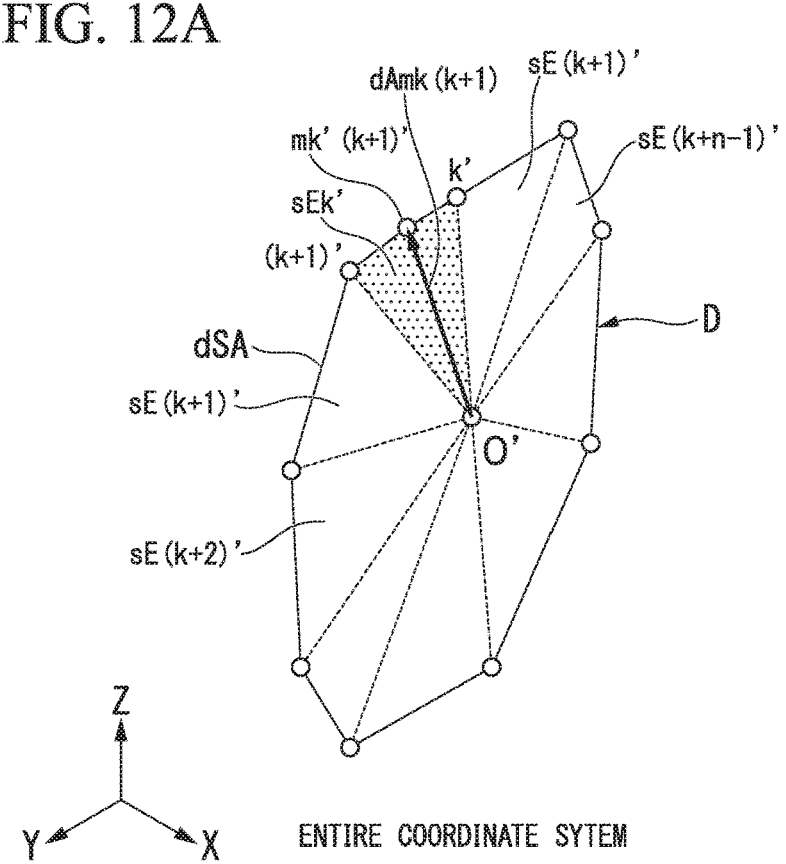
FIG. 12A is a diagram for describing a method of setting vectors on a deformed cross section in the second step to show the entire coordinate system.
Figure 12B:
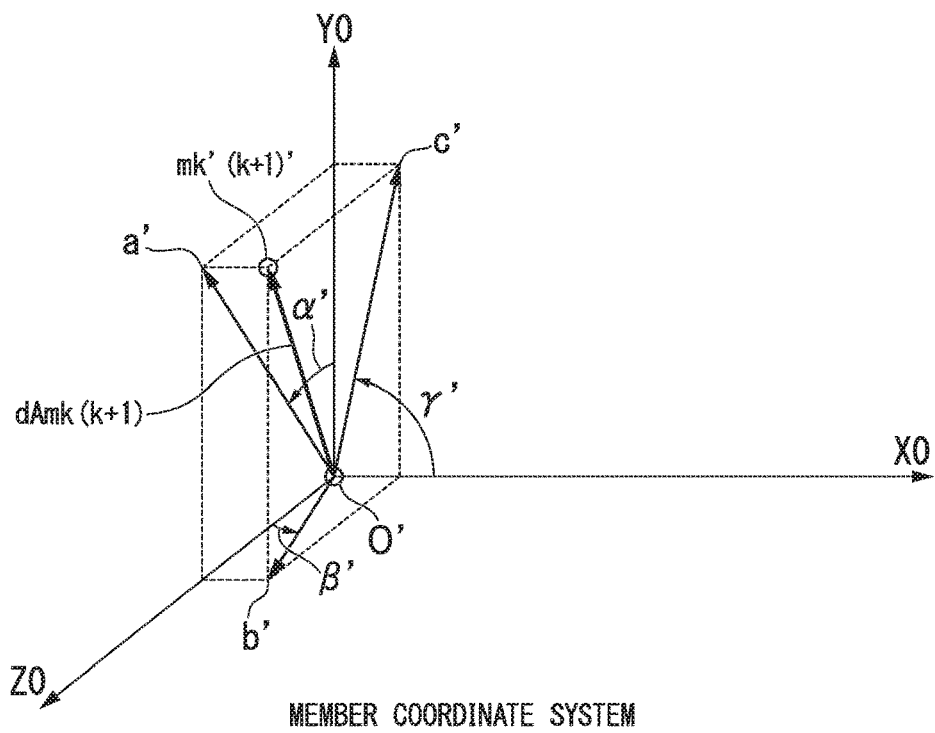
FIG. 12B is a diagram for describing the method of setting the vectors on the deformed cross section in the second step to show a member coordinate system.

Similarly, as shown in FIGS. 12A and 12B, the cross section of the member is divided as a triangular element sEk' (k'=1, 2, . . . , and n) having two arbitrary points (point k' and point k+1') in the outline of the deformed cross section dSA and the centroid O' out of the cross section, as vertices of the triangular elements.

Subsequently, the third step S3 shown in FIG. 3 is performed.

Specifically, a displacement when the triangular element sEk is deformed to the triangular element sEk' is calculated as an average value of displacements (point k->point k', point k+1->point k+1', point O->point O') of coordinates of the respective vertices of the triangular element before and after the deformation.

Initially, a rotation angle when the triangular element sEk is deformed to the triangular element sEk' is calculated using the vectors calculated using the vertices (including the points (central points of the respective vertices) determined based on the respective vertices) of the triangular elements. As shown in FIG. 11A, a vector iAmk(k+1) acquired by connecting a central point mk(k+1) of a side k(k+1) of the undeformed triangular element and the centroid O is determined. In this case, it is assumed that a member coordinate system X0Y0Z0 is determined using the member axial direction (approximately a normal direction of the cross section) of the transversal member 11 as an X0 axis, the vector iAmk(k+1) is provided such that an origin of the member coordinate system matches the centroid O, and vectors projected on a Y0Z0 surface, a Z0X0 surface, and an X0Y0 surface are used as a vector a, a vector b, and a vector c, as shown in FIG. 11B.

It is assumed that a rotation angle of the vector a around the X0 axis is α, a rotation angle of the vector b around the Y0 axis is β, and a rotation angle of the vector c around the Z0 axis is γ.

Similarly, as shown in FIG. 12A, a vector dAmk(k+1) acquired by connecting a central point mk'(k+1)' of a side k'(k+1)' of the deformed triangular element and the centroid O' is determined.

In this case, as shown in FIG. 12B, it is assumed that vectors projected on the Y0Z0 surface, the Z0X0 surface, and the X0Y0 surface in the member coordinate system X0Y0Z0 are respectively a vector a', a vector b', and a vector c'.

It is assumed that a rotation angle of the vector a' around the X0 axis is α', a rotation angle of the vector b' around the Y0 axis is β', and a rotation angle of the vector c' around the Z0 axis is γ'.

Figure 13:
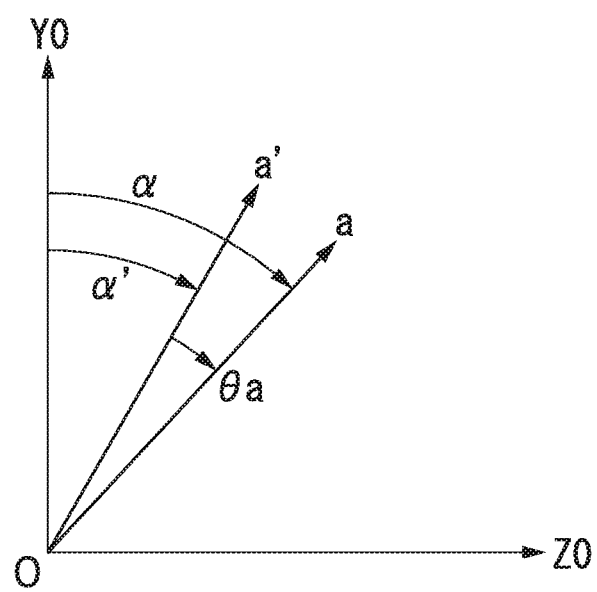
FIG. 13 is a diagram for describing a method of calculating rotation angles in a third step.

As shown in FIG. 13, if a rotation angle to the deformed vector a' from the undeformed vector a is θa (=α'-α), a rotation angle θa is calculated based on an outer product a×a' of the vector, as represented by the following expression (1).

[Expression 1]

$$\theta a = a\sin[|a \times a'|/(|a||a'|)] \quad (1)$$

Similarly, a rotation angle θb (=β'-β) to the vector b' from the vector b and a rotation angle θc (=γ'-γ) to the vector c' from the vector c are respectively applied to Expression (2) and Expression (3) to be described below.

[Expression 2]

$$\theta b = a\sin[|b \times b'|/(|b||b'|)] \quad (2)$$

[Expression 3]

$$\theta c = a\sin[|c \times c'|/(|c||c'|)] \quad (3)$$

Accordingly, rotation angles when the triangular element sEk is deformed to the triangular element sEk' are calculated as (θa, θb, and θc).

The translational displacements and the rotation angles as the cross section iSA (dSA) are calculated as an average value of the displacements and the rotation angles of the triangular element sEk (sEk') (k=1, 2, . . . , and n) (fourth step S4).

In the deformation to the deformed cross section dSA from the undeformed cross section iSA, in a case where the deformation in which the cross section is distorted is large, there may be a strong tendency for the displacements and the rotation angles of the triangular element to be varied. In this case, it is possible to reduce a calculation error when distortion of the cross section influences on values of the displacements and the rotation angles as the member cross section by selecting a value of the element of which a deviation (a variance from the average) is large and removing the selected value.

As the process of calculating the vector in the above-described second step S2, a method of calculating a vector acquired by connecting two points in the outline, or a method (to be described below) of calculating a vector in a normal direction with respect to the member cross section may be used in addition to a method of calculating a vector acquired by connecting two points including one point in the outline and one point out of the outline within the plane including the member cross section.

That is, the rotation angle of the triangular element may be calculated based on the vector determined by a method other than the vector iAmk(k+1) within the surface shown in FIGS. 11A to 12B, and 14A.

Figure 14A:
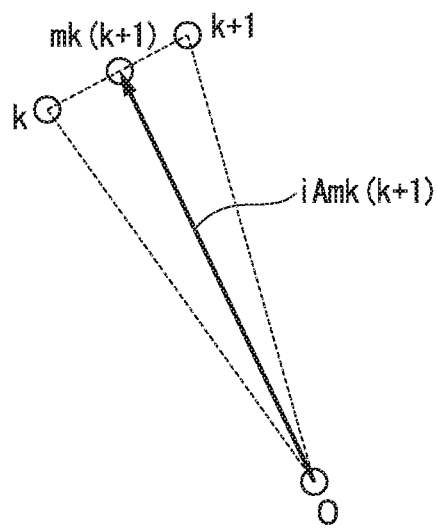
FIG. 14A is a diagram showing a method of setting vectors for calculating rotation angles of a triangular element.
Figure 14B:
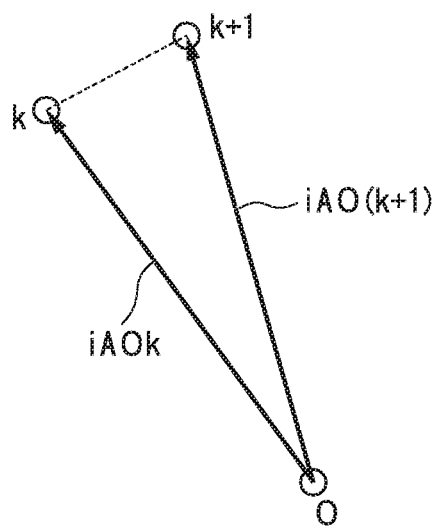
FIG. 14B is a diagram showing the method of setting the vectors for calculating the rotation angles of the triangular element.

For example, as shown in FIG. 14B, the rotation angle of the triangular element may be calculated as an average value of the rotation angles of the vectors iAOk and iAO(k+1) using the centroid O of the triangular element as an origin.

Figure 14C:
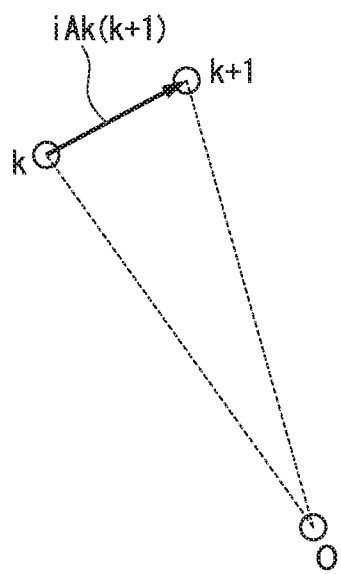
FIG. 14C is a diagram showing the method of setting the vectors for calculating the rotation angles of the triangular element.

As shown in FIG. 14C, the rotation angle of the triangular element may be calculated as the rotation angle of the vector iAk(k+1) acquired by connecting the point k and the point k+1. In the case where the method of FIG. 14C is used, the displacement and the rotation angle as the cross section the triangular element may be calculated using only the points in the outline without setting the triangular element, that is, without using the centroid O out of the outline.

Figure 14D:
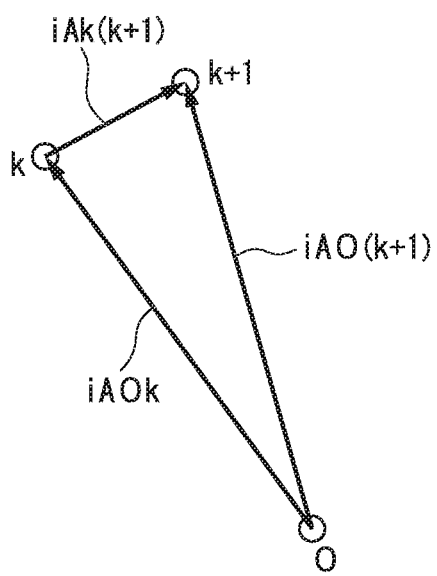
FIG. 14D is a diagram showing the method of setting the vectors for calculating the rotation angles of the triangular element.

As shown in FIG. 14D, the rotation angle of the triangular element may be calculated as an average of iAk(k+1), iAOk, and iAO(k+1).

Figure 15A:
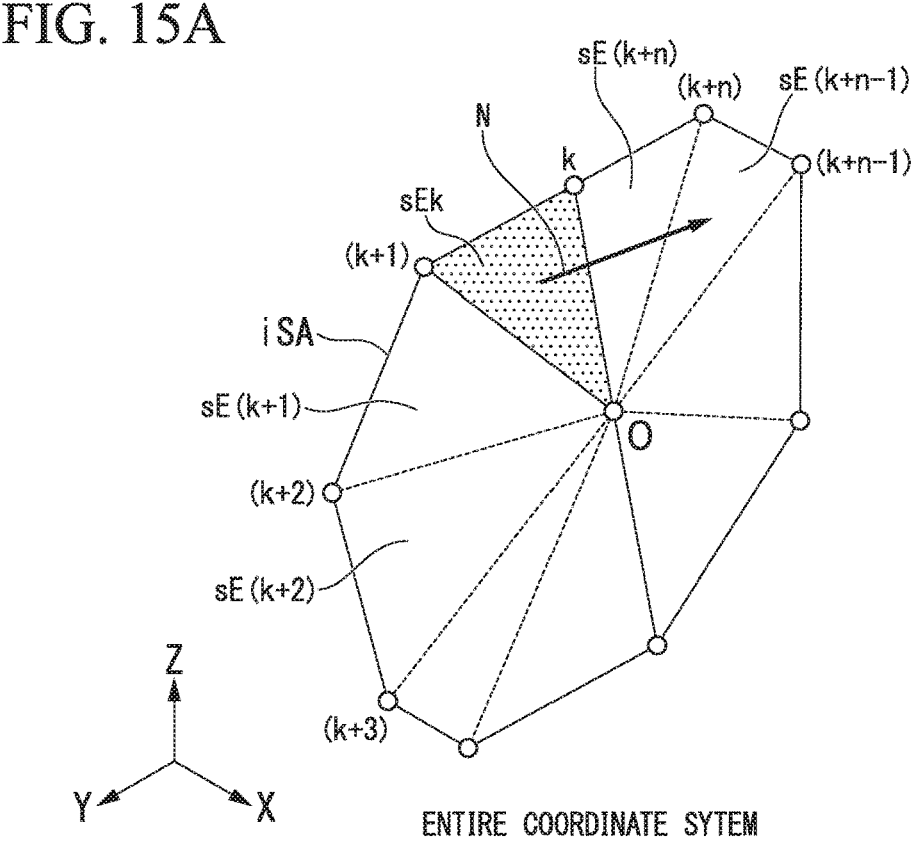
FIG. 15A is a diagram for describing a method of setting normal vectors of the triangular element to show the entire coordinate system.
Figure 15B:
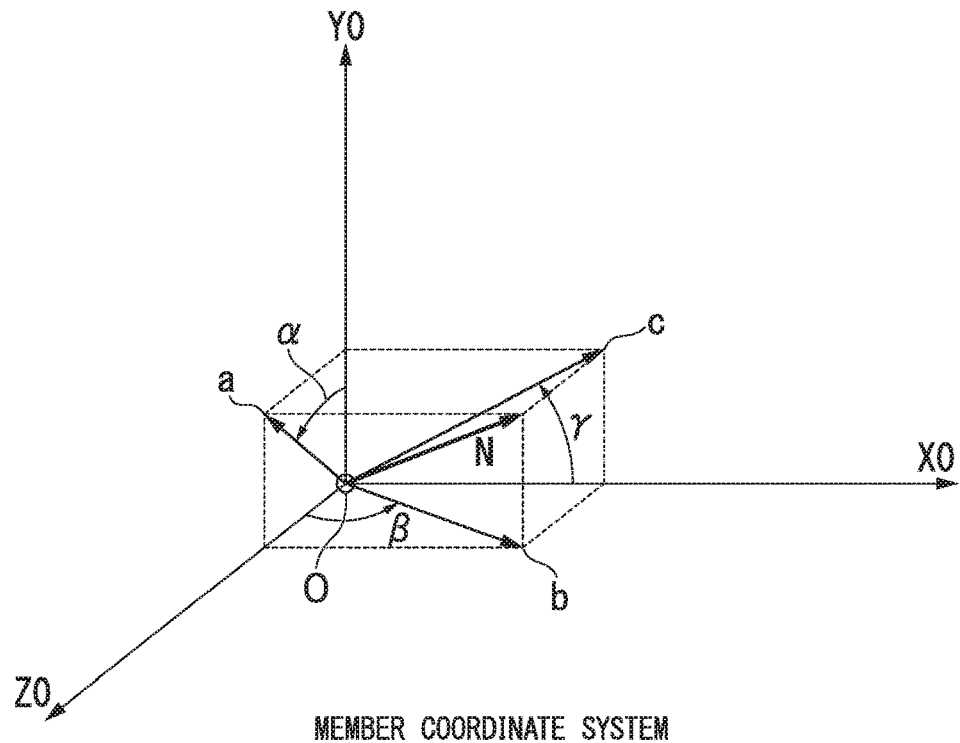
FIG. 15B is a diagram for describing the method of setting the normal vectors of the triangular element to show a member coordinate system.

As the method of calculating the rotation angle of the triangular element, a normal vector N (a magnitude of a vector may be arbitrary and a unit vector may be determined) of the triangular element shown in FIGS. 15A and 15B may be used as described above irrespective of the vector within the surface of the triangular element as shown in FIGS. 11A to 14D.

Figure 16:
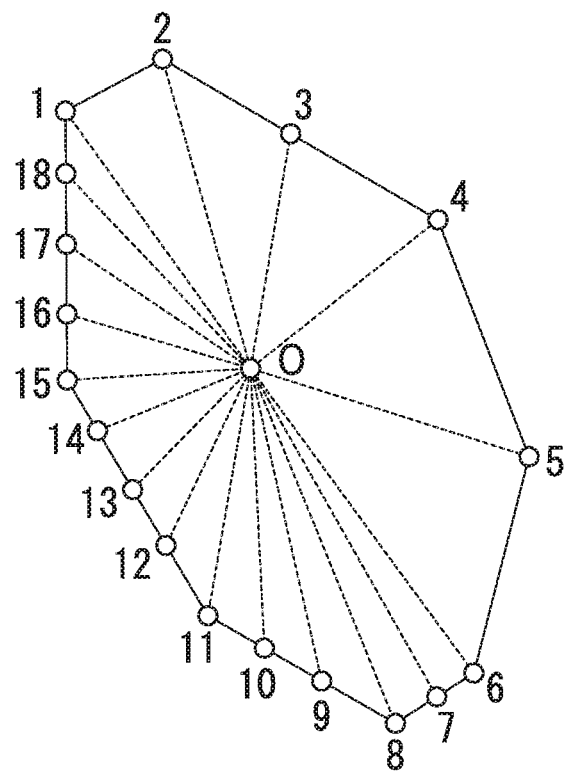
FIG. 16 is a diagram showing points on the displacement extraction surface before and after the deformation to describe a case where there are a coarse region and a dense region in arrangement of panel points on the cross section.

In a case where there are a coarse region (points 1, 2, 3, 4, 5, and 6) and a dense region (points 6, 7, ..., 17, 18, and 1) in the arrangement of panel points on the member cross section as shown in FIG. 16, if the displacement and the rotation angle as the cross section are calculated as an arithmetic average of the displacements and the rotation angles calculated from the respective triangular elements, it is easy to cause the influence of the coarse and dense degree of the panel points. In contrast, it is possible to suppress an error due to the influence of the coarse and dense degree of the panel points by calculating the translational displacement and the rotation angle as the member cross section, as an average of values acquired by multiplying a weighting factor depending on a length of a side (a side present on a circumference of the member cross section without including the centroid O) of the triangular element or an area of the triangular element.

Figure 17:
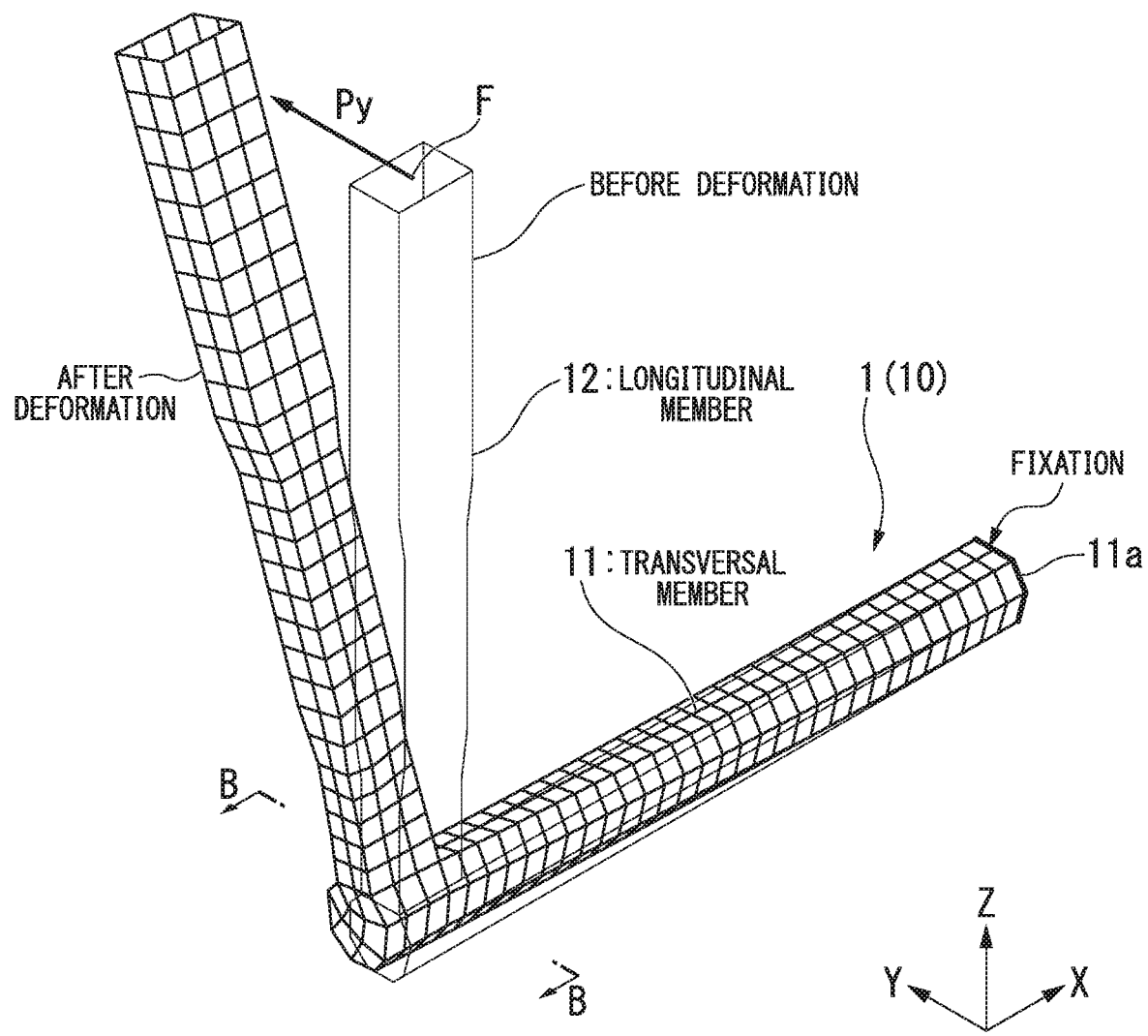
FIG. 17 is a perspective view of an analysis model showing a deformation state of the L-shaped structure in a case where a load Py in a Y-axis positive direction is applied.
Figure 18:
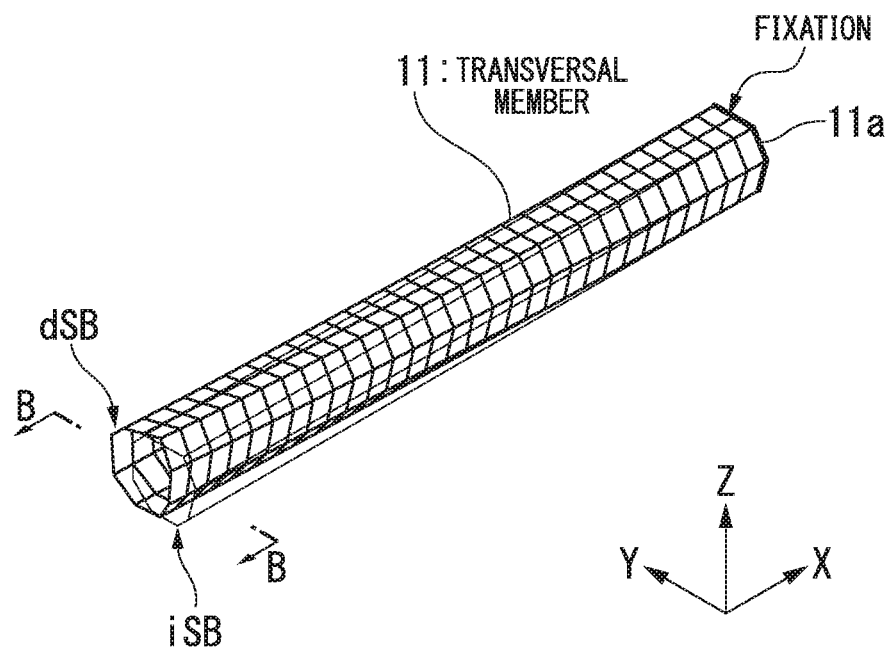
FIG. 18 is a cross sectional view taken along line B-B shown in FIG. 17 to show a deformation state in which a longitudinal member is cut along line B-B.
Figure 19:
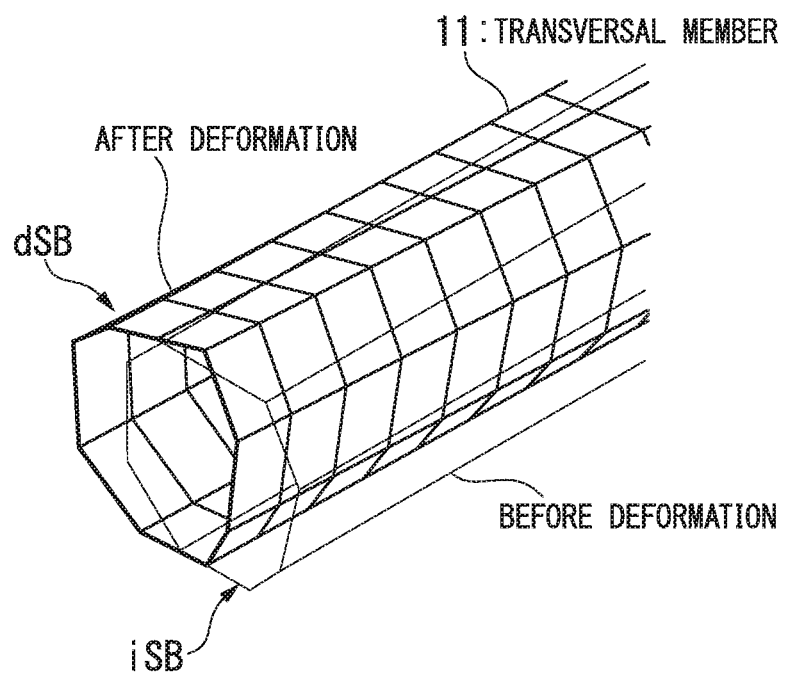
FIG. 19 is an enlarged view of major parts in a cut portion shown in FIG. 18.

Next, FIG. 17 shows the deformation state of the L-shaped structure 1 in a case where the load Py in the Y-axis positive direction is applied at the loading point F of the longitudinal member 12. As shown in FIG. 17, the bending deformation around the X axis is generated in the longitudinal member 12, and the bending deformation around the Z axis and the torsional deformation around the X axis are generated in the transversal member 11. As shown in FIGS. 18 and 19, an undeformed cross section iSB is primarily changed to a deformed cross section dSB while accompanying the rotation of the cross section around the X axis and the displacement of the cross section to the Y-axis direction. In this case, the cross section of the undeformed cross section iSB is changed to the deformed cross section dSB while accompanying the deformation in which the cross section is distorted.

Figure 20:
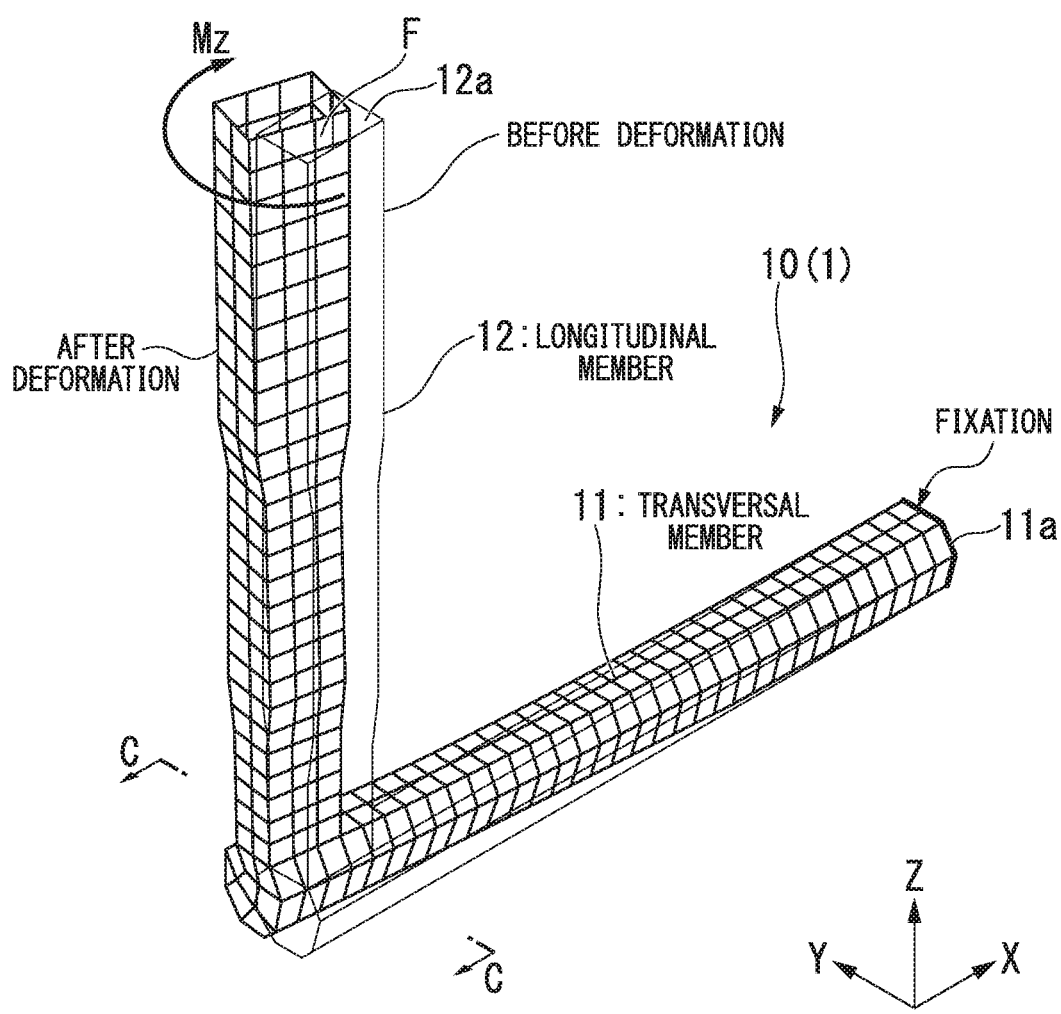
FIG. 20 is a perspective view of an analysis model showing a deformation state of the L-shaped structure in a case where a torsional load Mz around a Z axis is applied.
Figure 21:
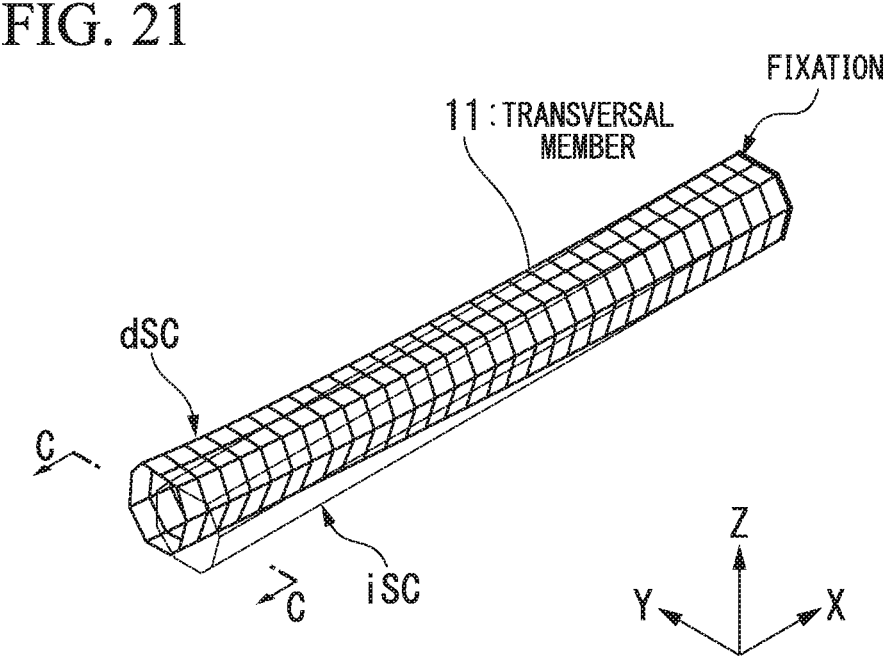
FIG. 21 is a cross sectional view taken along line C-C shown in FIG. 20 to show a deformation state in which the transversal member is cut along line C-C.
Figure 22:
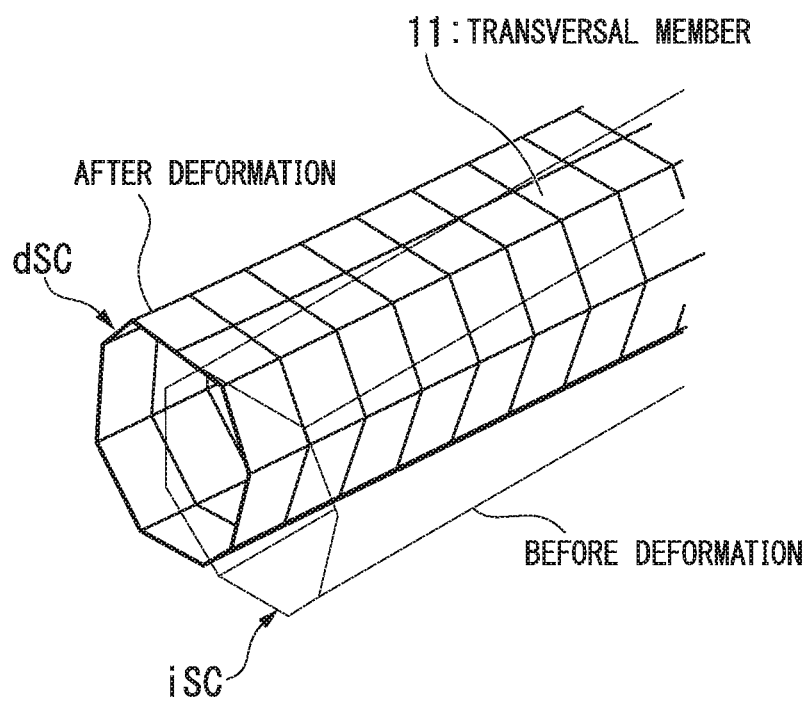
FIG. 22 is an enlarged view of major parts in a cut portion shown in FIG. 21.

Next, FIG. 20 shows the deformation state of the L-shaped structure 1 in a case where the torsional load Mz around the Z axis is applied at the loading point F of the longitudinal member 12. As shown in FIG. 20, the torsional deformation around the Z axis is generated in the longitudinal member 12, and the bending deformation around the Z axis is generated in the transversal member 11. As shown in FIGS. 21 and 22, an undeformed cross section iSC is primarily changed to a deformed cross section dSc while accompanying the displacement of the cross section to the Z-axis direction.

In the deformation mode in a case where the loads Px, Py, and Mz is applied to the L-shaped structure 1, the results analyzed by the above-described analysis method (analysis flow shown in FIG. 3) are respectively shown in FIGS. 23A to 28B.

Here, as a displacement δ and a rotation angle θ of the member cross section, the rotation angle θ of the triangular element is calculated as an average value of the rotation angles of the vectors iAOk and iAO(k+1) using the centroid O of the triangular element as the origin, that is, the method shown in FIG. 14B by using the point out of the outline as the centroid O.

Here, in FIGS. 23A to 28B, a horizontal axis represents a location (mm) of the cross section in a lengthwise direction of the member (transversal member 11 or longitudinal member 12), and a vertical axis represents a displacement δ (mm) or a rotation angle θ (rad). In these diagrams, the change amounts in the translational displacement and the rotation angle as the member cross section from the displacements and the rotation angles in the locations of two or more arbitrary cross sections in the lengthwise direction are calculated (fifth step S5). Values (distances) of a location LX of the transversal member 11 and a location LZ of the longitudinal member 12 become larger as these locations become closer to the positive direction from the negative direction.

Figure 23A:
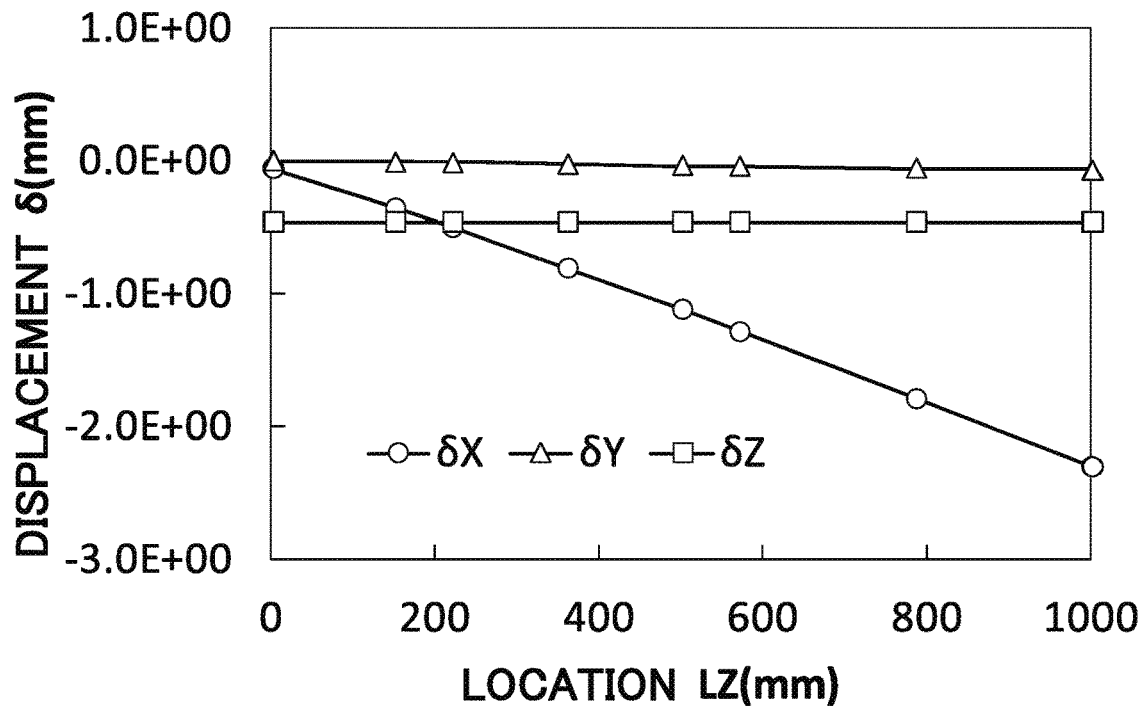
FIG. 23A is a diagram showing a result acquired by analyzing a deformation mode in a case where the load Px is applied to the structure to show displacements of the longitudinal member.
Figure 24A:
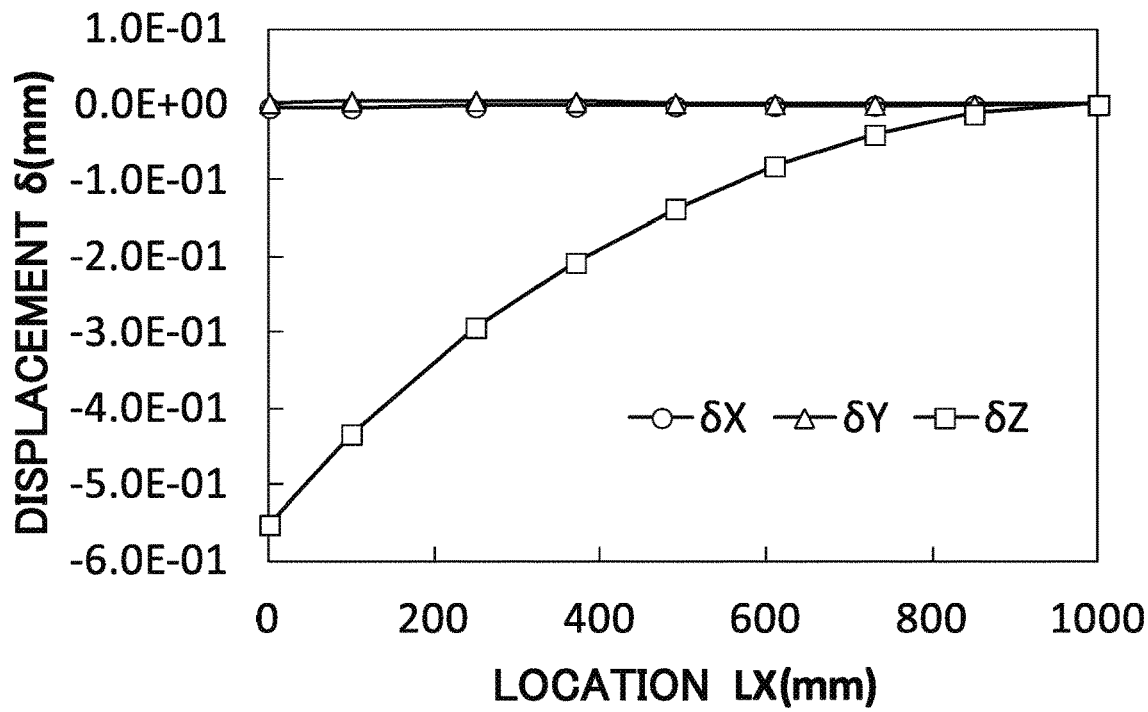
FIG. 24A is a diagram showing the result acquired by analyzing the deformation mode in a case where the load Px is applied to the structure to show displacements of the transversal member.

As shown in FIGS. 23A and 24A, it can be seen that an absolute value of a deformation δX of the longitudinal member 12 to the X-axis direction and an absolute value of a deformation δZ of the transversal member 11 to the Z-axis direction are increased with respect to the load Px in the lengthwise direction of the member. Meanwhile, the deformation δY of the longitudinal member 12 to the Y-axis direction and the deformation δX of the transversal member 11 to the X axis and the deformation δY thereof to the Y-axis direction are rarely generated. It can be seen that the deformation δZ of the longitudinal member 12 to the Z-axis direction is slightly generated but is rarely changed in the lengthwise direction of the member (sixth step S6).

Figure 23B:
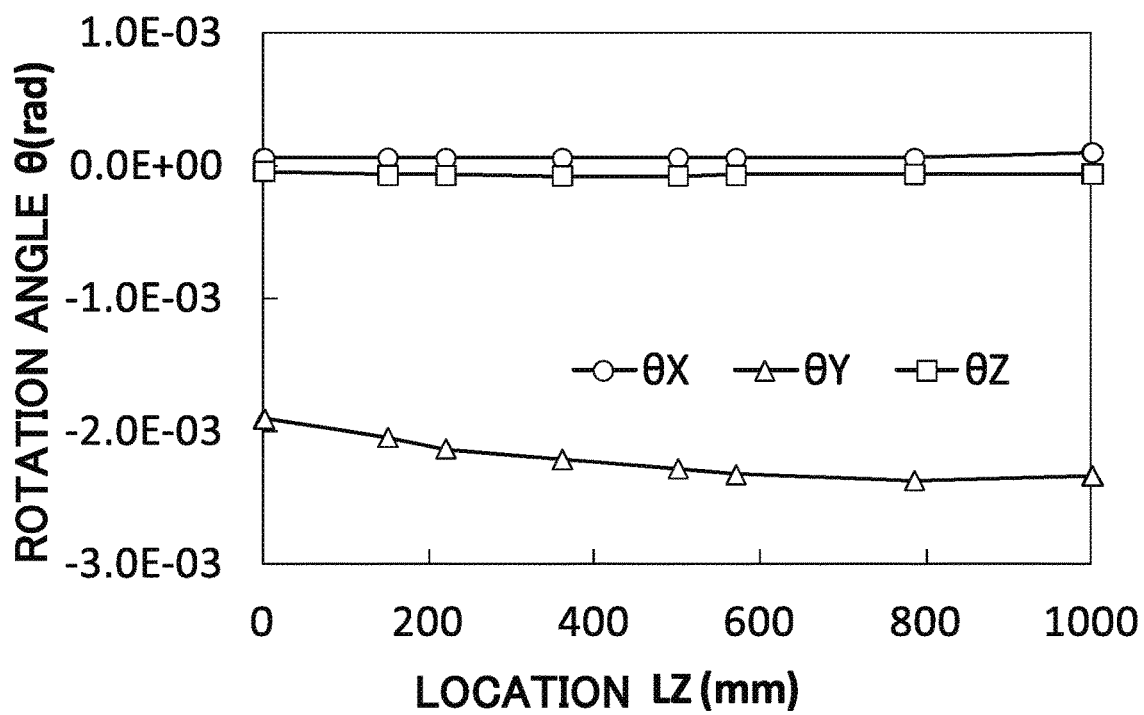
FIG. 23B is a diagram showing a result acquired by analyzing the deformation mode in a case where the load Px is applied to the structure to show rotation angles of the longitudinal member.
Figure 24B:
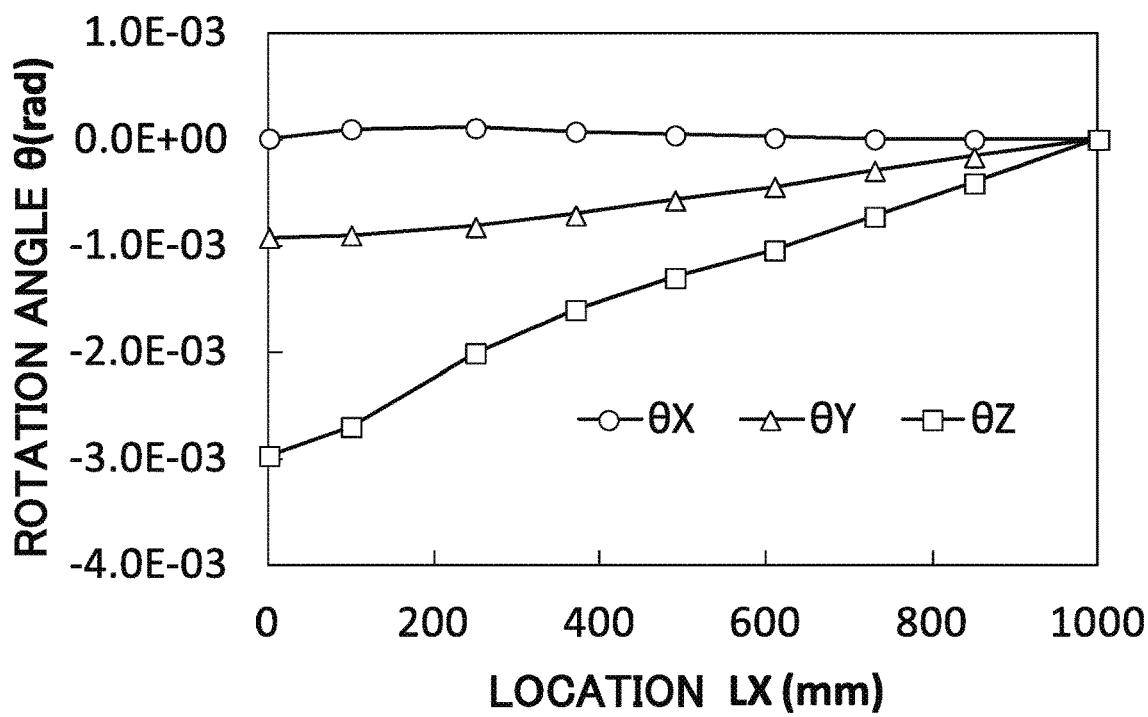
FIG. 24B is a diagram showing the result acquired by analyzing the deformation mode in a case where the load Px is applied to the structure to show rotation angles of the transversal member.
Figure 25A:
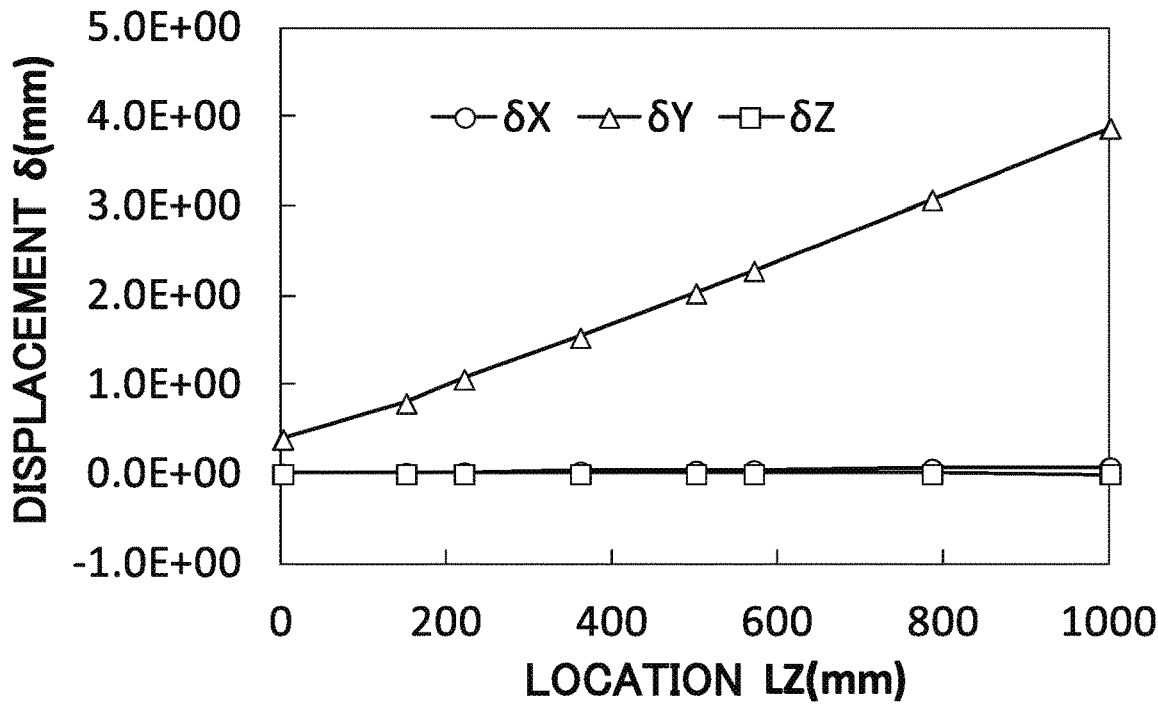
FIG. 25A is a diagram showing a result acquired by analyzing a deformation mode in a case where the load Py is applied to the structure to show displacements of the longitudinal member.
Figure 25B:
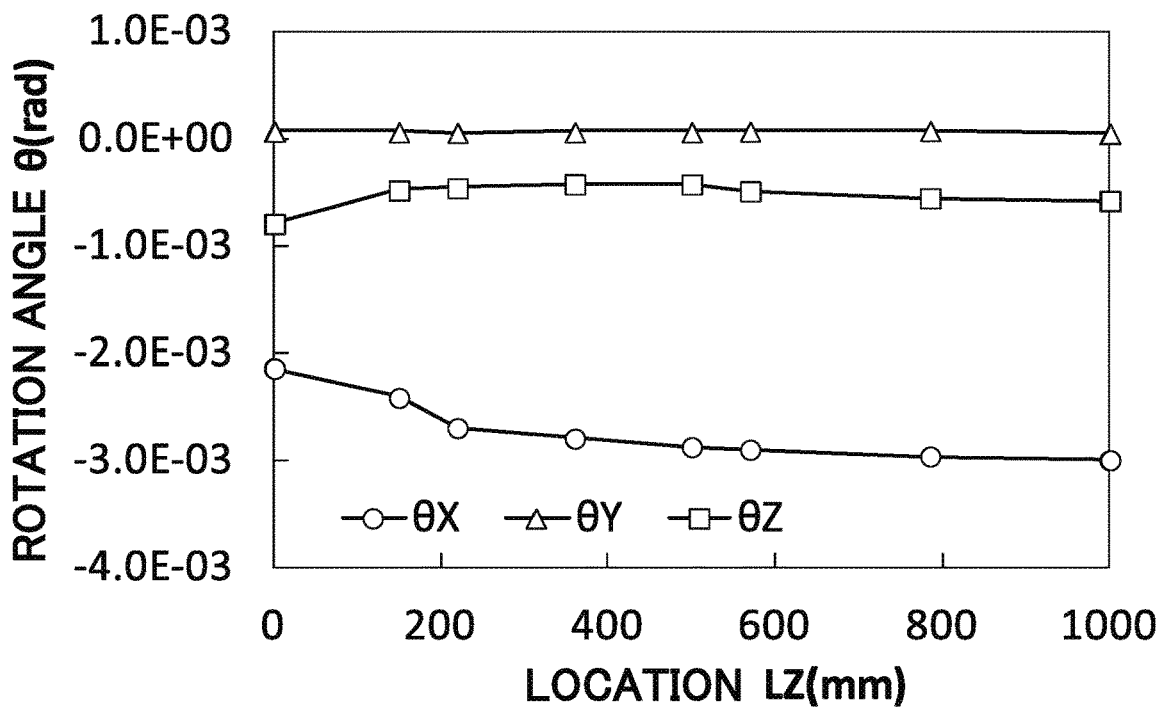
FIG. 25B is a diagram showing a result acquired by analyzing the deformation mode in a case where the load Py is applied to the structure to show rotation angles of the longitudinal member.
Figure 26A:
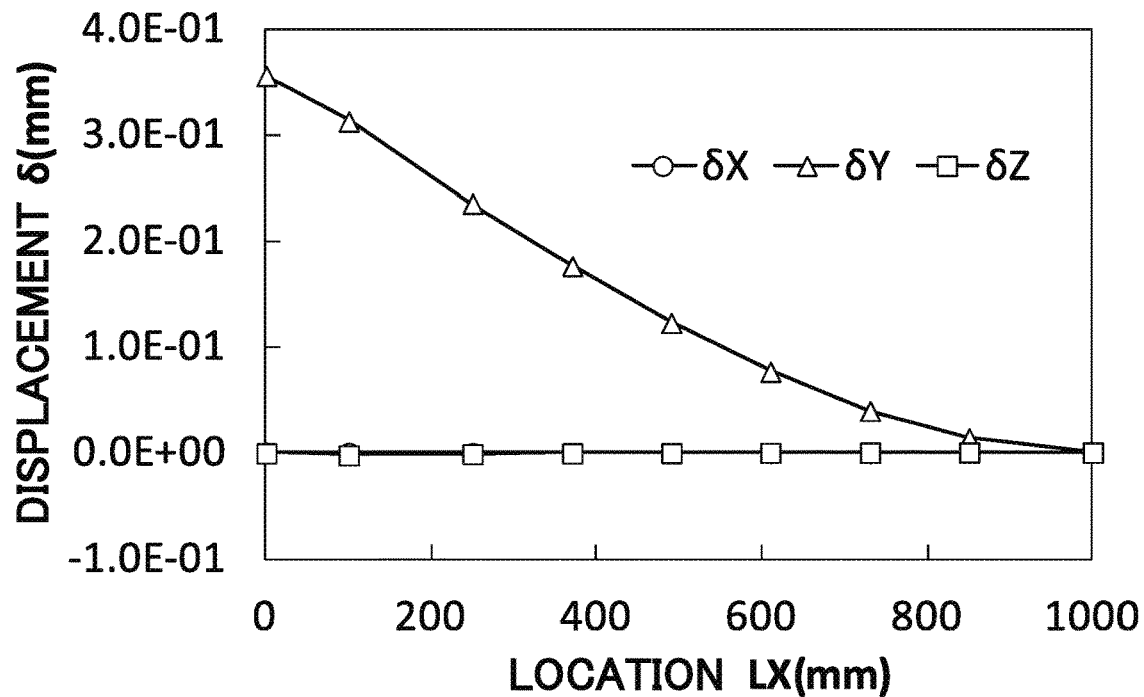
FIG. 26A is a diagram showing the result acquired by analyzing the deformation mode in a case where the load Py is applied to the structure to show displacements of the transversal member.
Figure 26B:
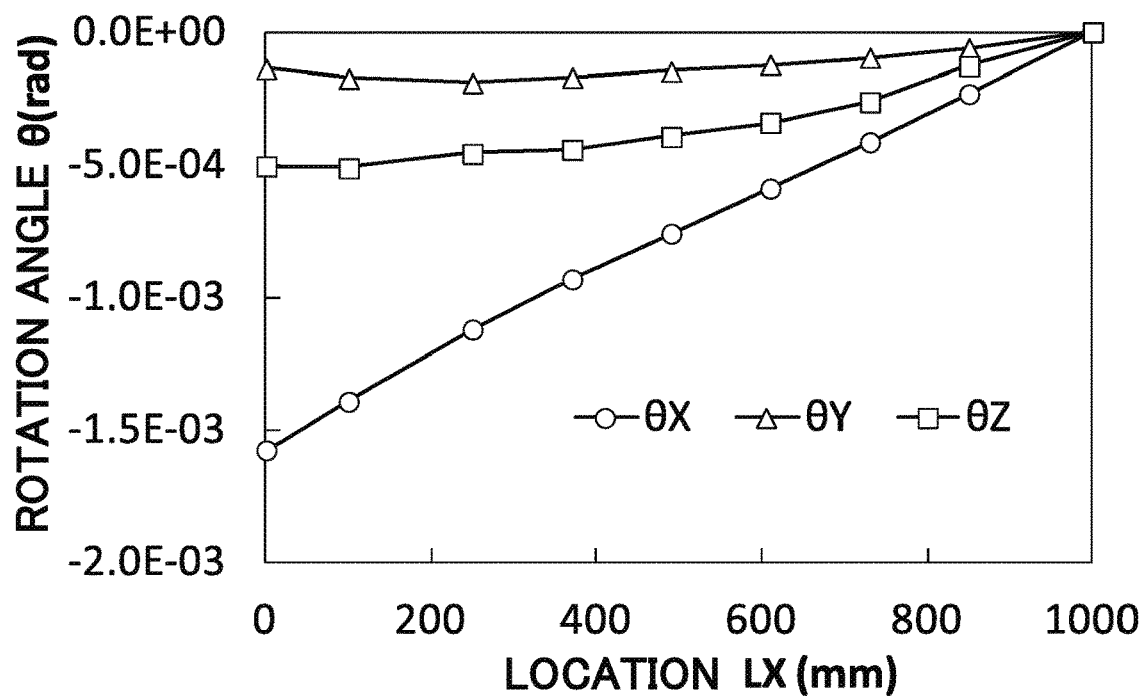
FIG. 26B is a diagram showing the result acquired by analyzing the deformation mode in a case where the load Py is applied to the structure to show rotation angles of the transversal member.
Figure 27A:
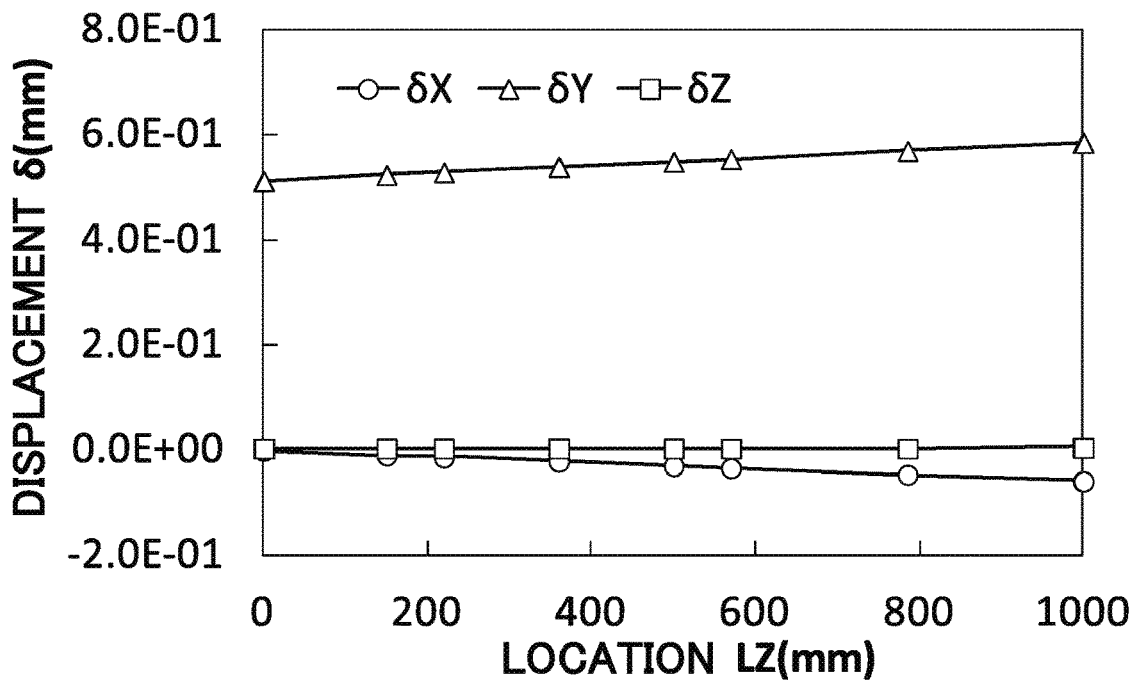
FIG. 27A is a diagram showing a result acquired by analyzing a deformation mode in a case where the torsional load Mz is applied to the structure to show displacements of the longitudinal member.
Figure 27B:
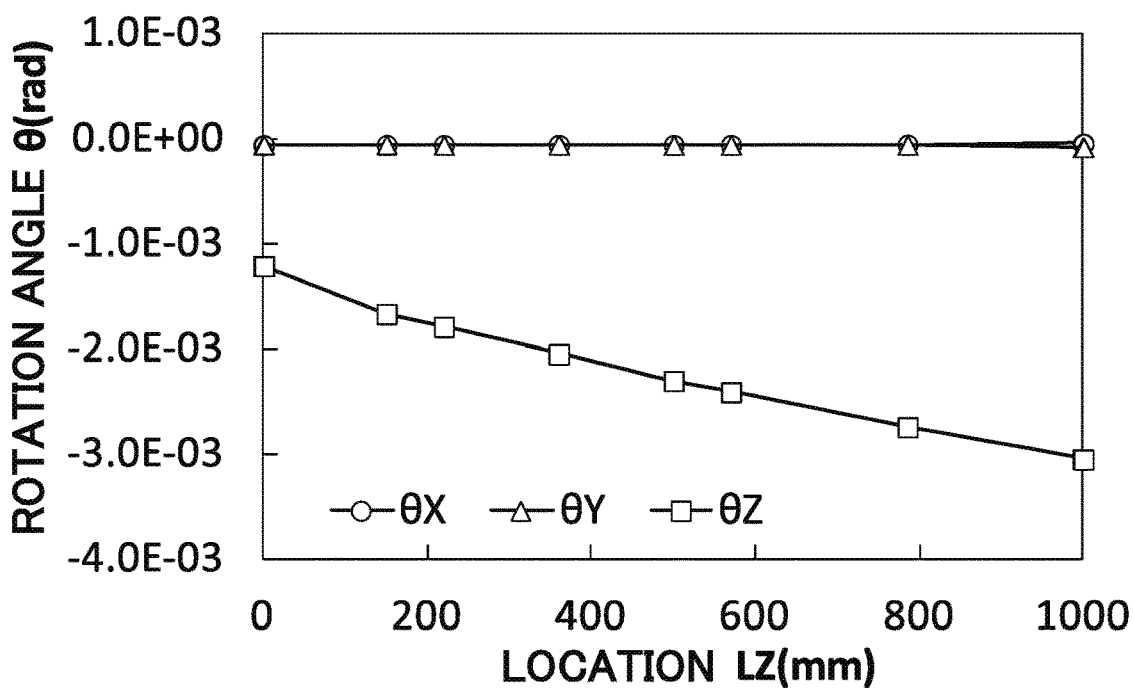
FIG. 27B is a diagram showing a result acquired by analyzing the deformation mode in a case where the torsional load Mz is applied to the structure to show rotation angles of the longitudinal member.
Figure 28A:
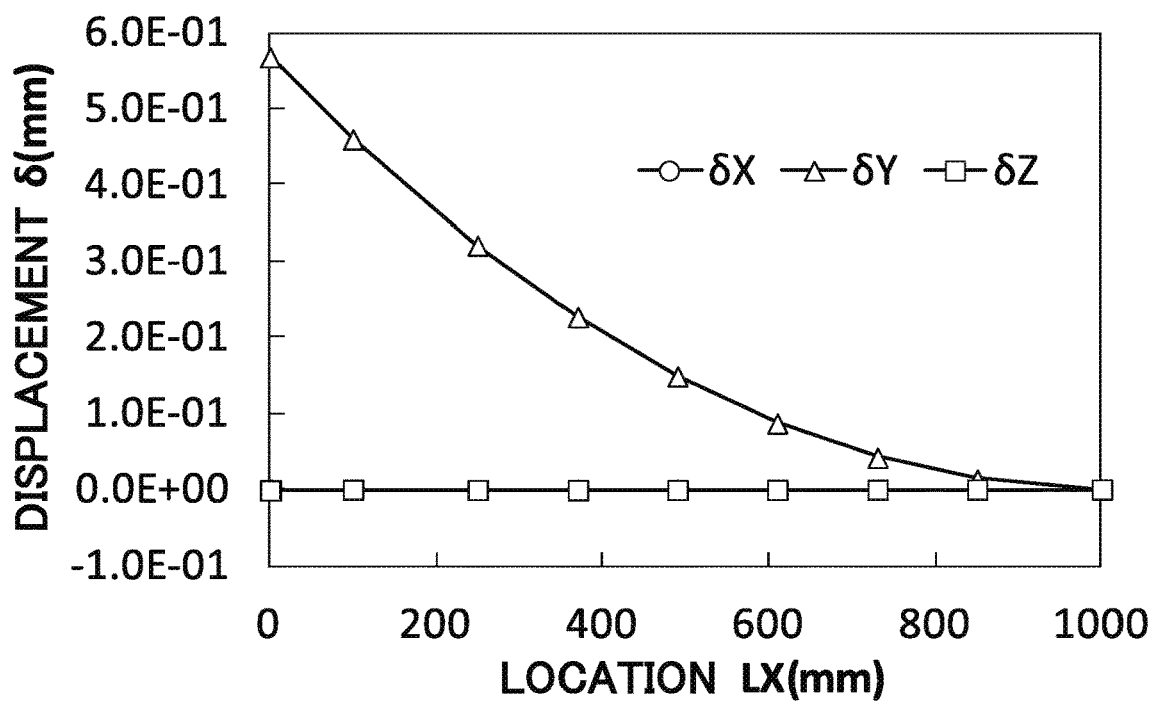
FIG. 28A is a diagram showing the result acquired by analyzing the deformation mode in a case where the torsional load Mz is applied to the structure to show displacements of the transversal member.
Figure 28B:
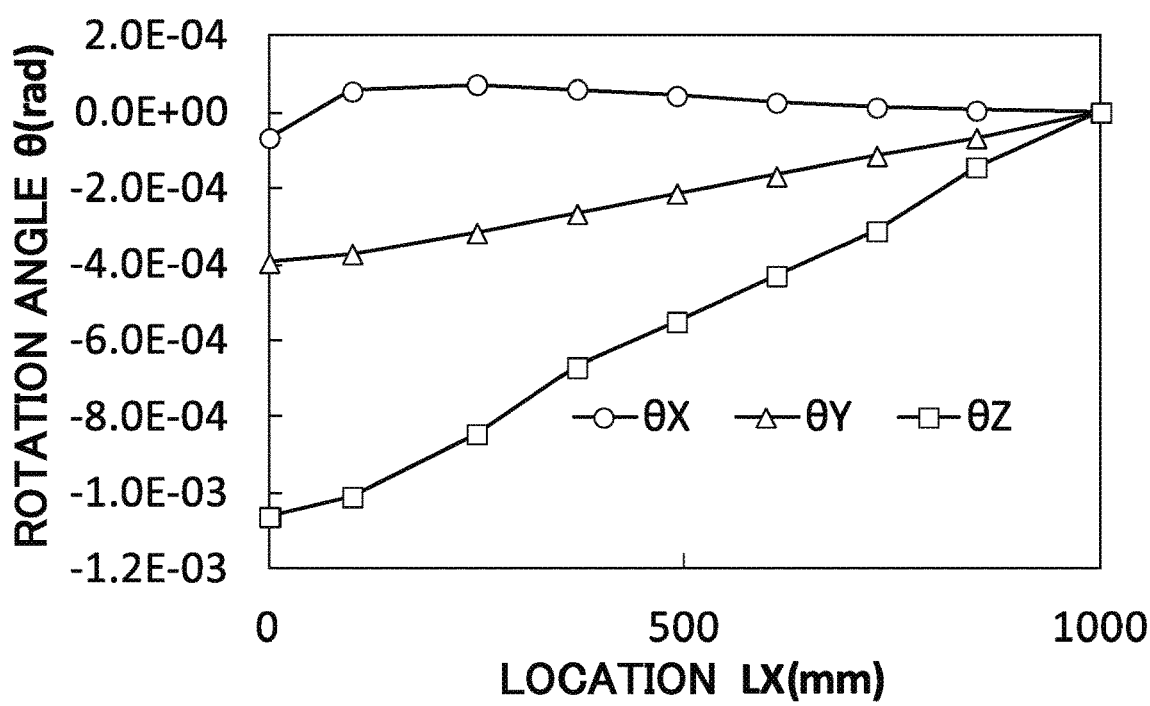
FIG. 28B is a diagram showing the result acquired by analyzing the deformation mode in a case where the torsional load Mz is applied to the structure to show rotation angles of the transversal member.

As shown in FIGS. 23B and 24B, it can be seen that a rotation angle θY of the longitudinal member 12 around the Y axis, a rotation angle θY of the transversal member 11 around the Y axis, and a rotation angle θZ thereof around the Z axis are generated and are changed in the lengthwise direction of the member. Meanwhile, it can be seen that the rotation angle θX of the longitudinal member 12 around the X axis, the rotation angle θZ thereof around the Z axis, the rotation angle θX of the transversal member 11 around the X axis are rarely generated (sixth step S6).

As shown in FIGS. 25A, 25B, 26A, 26B, 27A, 27B, 28A, and 28B, similarly to the above-described load Px, as to the displacements and the rotation angles of the longitudinal member 12 and the transversal member 11 with respect to the load Py and the load Mz, a place and a deformation state in which the deformation of the member is in progress may be recognized from the change amounts of the displacement δ and the rotation angle θ at the locations (LX and LZ) of the member in the length direction (sixth step S6).

As stated above, in the present embodiment, the deformation mode analysis method for the member of the structure is performed, and thus, the place and the deformation state in which the displacement or the rotation angle is in progress may be quantitatively recognized based on three-dimensional deformation amounts (δX, δY, δZ, θX, θY, and θZ) in the member constituting the structure.

Thus, it is possible to precisely evaluate the deformation over the entire length of the members 11 and 12 constituting the structure 1.

A portion and a deformation state acting as weakness in ensuring rigidity of the structure are recognized based on the analysis result of the deformation modes, and thus, it is possible to efficiently find a structure specification for ensuring the rigidity.

Figure 29:
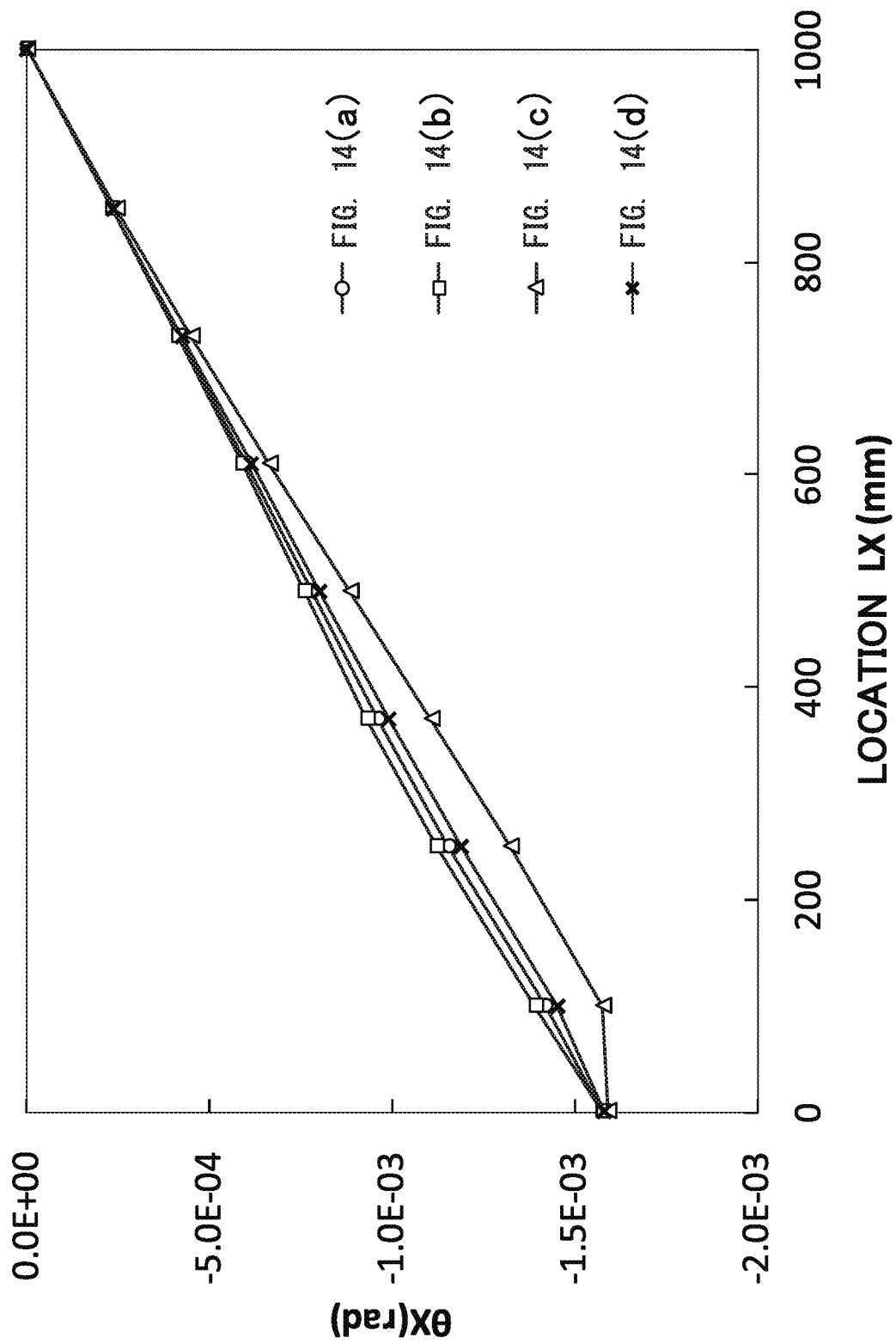
FIG. 29 is a diagram showing a result acquired by calculating a torsional angle of the transversal member around the X axis in the structure that influenced by the load Py in the Y-axis positive direction.

FIG. 29 shows a result acquired by calculating a torsional angle θx of the transversal member 11 around the X axis in the L-shaped structure 1 (see FIG. 17) that is influenced by the load Py in the Y-axis positive direction. Unlike the case where the methods of FIGS. 14A, 14B, and 14D using the point in the outline of the member cross section and the point out of the outline within the displacement extraction surface D are used, it can be seen that an error is generated in an evaluation value and there is a tendency for the result and evaluation value to be separated from the results and evaluation values of the other methods in a case where the method of FIG. 14C without using the point out of the outline is used.

That is, the point out of the outline on the substantially same surface as the cross section of the member is used, and thus, an error when a local deformation (see FIG. 9) in which the cross section of the member is distorted influences on the evaluation value of the rotation angle or displacement as the cross section is reduced. Accordingly, it is possible to improve the precision of the deformation mode analysis of the structure.

In the deformation mode analysis method for the structure, the structure reinforcement method using the deformation mode analysis method, the computer program for the deformation mode analysis of the structure, and the recording medium according to the present embodiment described above, it is possible to analyze a complicated deformation in which the bending or torsion generated in the member constituting the structure is coupled, and it is possible to provide an effective reinforcement method depending on the deformation mode.

Hereinafter, a deformation mode analysis method for a structure, a structure reinforcement method using the deformation mode analysis method, a computer program for deformation mode analysis of the structure, and a recording medium according to another embodiment of the present invention will be described with reference to the accompanying drawings. Here, the same or similar members and portions as and to those of the first embodiment will be assigned the same reference symbols, and the description thereof will be omitted. Further, configurations different from those of the first embodiment will be described.

Second Embodiment

Figure 30:
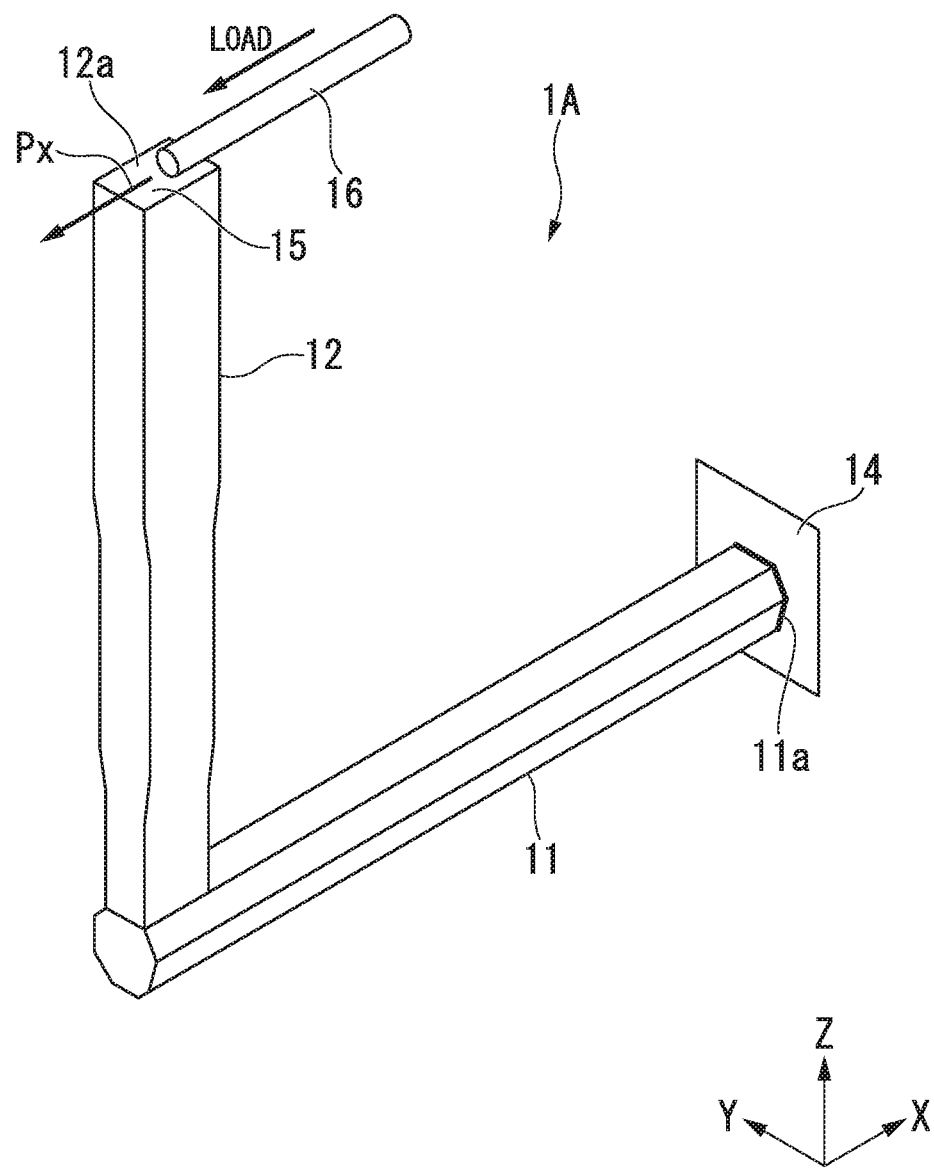
FIG. 30 is a perspective view showing a configuration of a test object for a structural test according to a second embodiment of the present invention.
Figure 31:
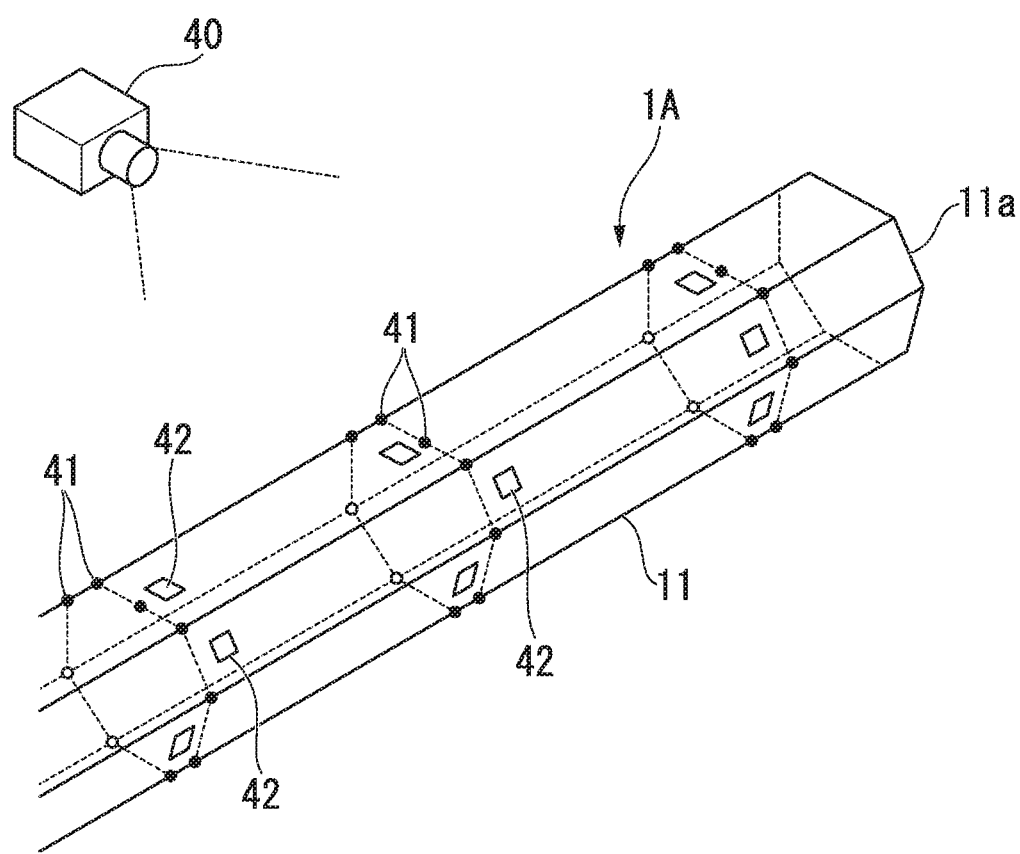
FIG. 31 is a diagram for describing a photographic measurement method for the test object shown in FIG. 30.
Figure 31:
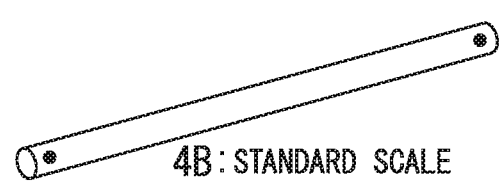
Figure 31:
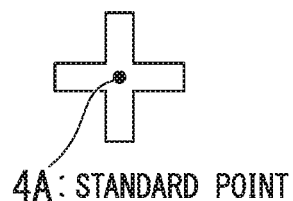
Figure 32:
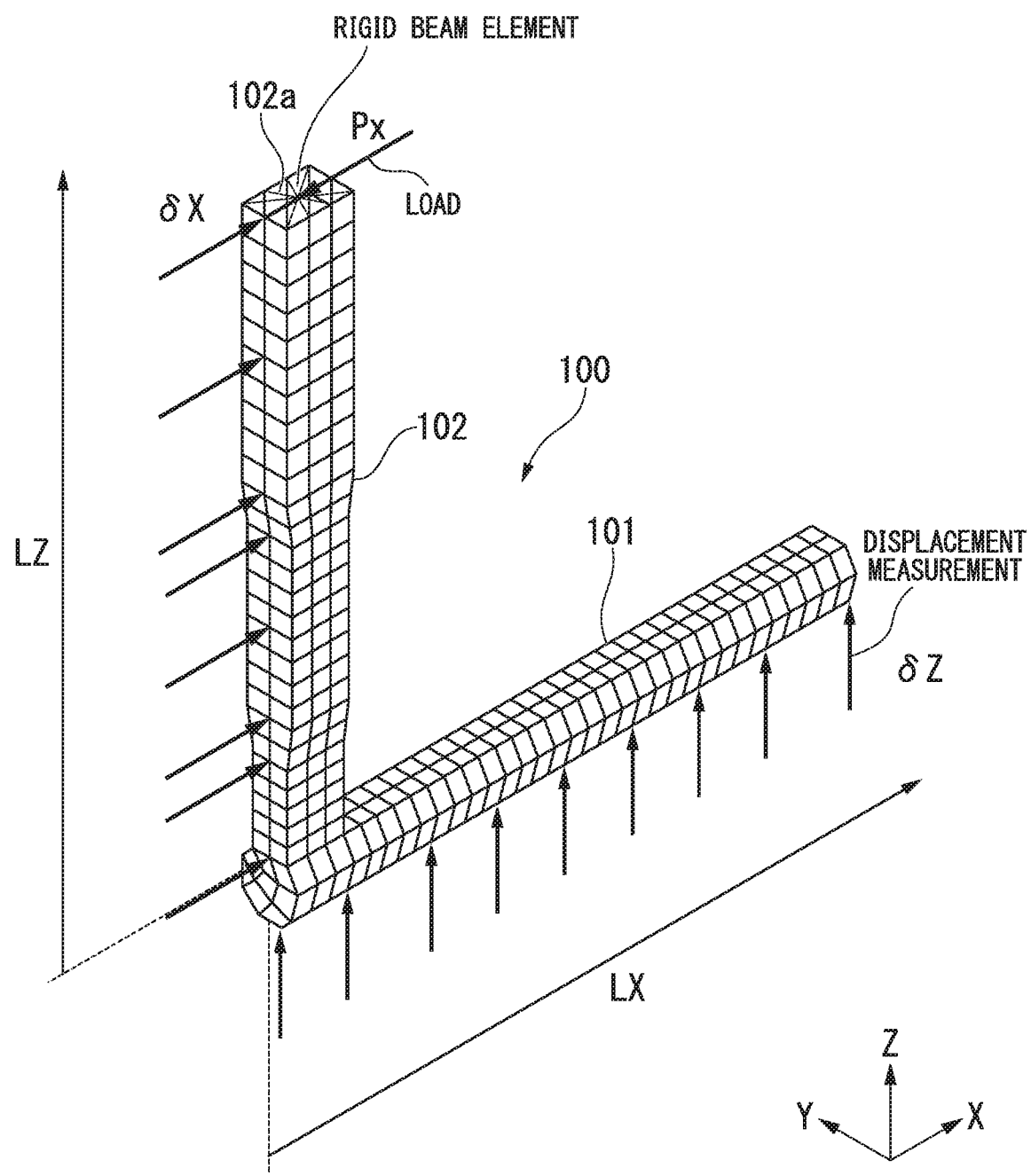
FIG. 32 is a perspective view for describing a method of ascertaining the deformation mode of the structure of the related art.
Figure 33:
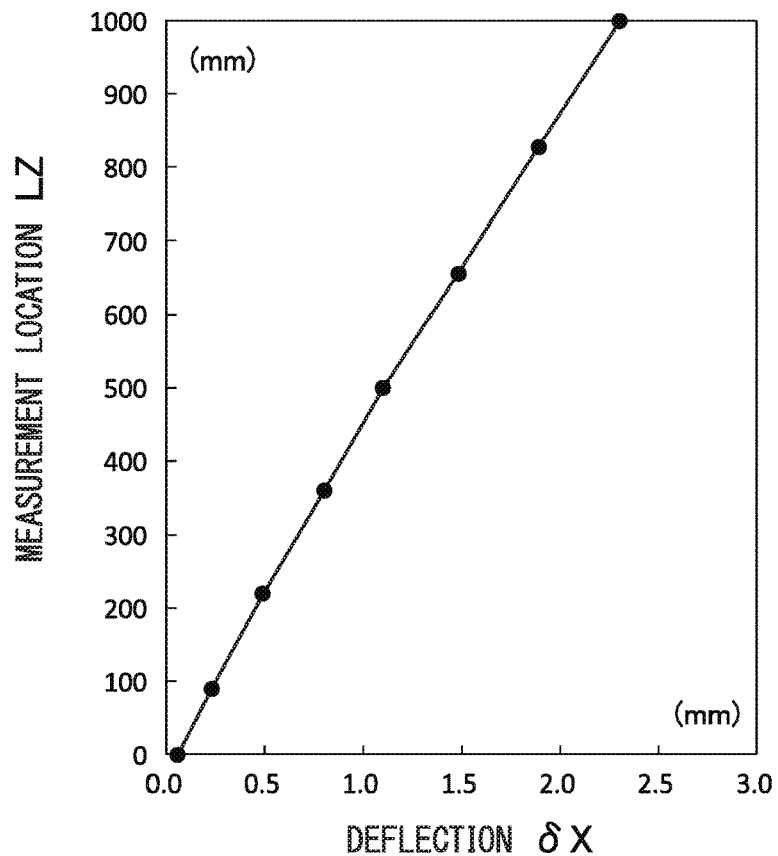
FIG. 33 is a diagram showing a result (deflection of the longitudinal member) acquired through the deformation measurement of FIG. 32.
Figure 34:
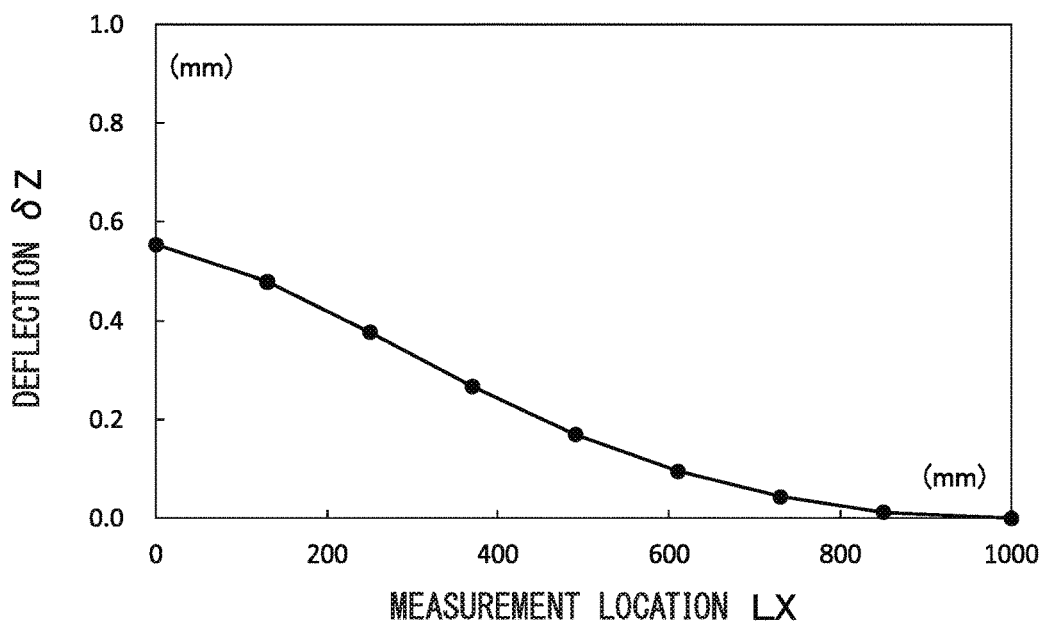
FIG. 34 is a diagram showing a result (deflection of the transversal member) acquired through the deformation measurement of FIG. 32.

As shown in FIGS. 30 and 31, a deformation mode analysis method for a structure according to a second embodiment is applied to a structural test.

In a case where a structural test is used in quantifying deformation characteristics of the structure, the structural test is performed using only the mode analysis unit 25 without using the model creation unit 23 and the structural analysis unit 24 of the processing unit 22 of the structural analysis device 2 shown in FIG. 4 in the deformation mode analysis flow shown in FIG. 3.

As shown in FIG. 30, in the present embodiment, the deformation mode of the structure is analyzed based on a structural test using a test object 1A (structure). In FIG. 30, XYZ represent the entire coordinate system.

The test object 1A has the same shape as the L-shaped structure 1 shown in FIG. 1 including the transversal member 11 and the longitudinal member 12, fixes and supports an end surface 11a of the transversal member 11 in the X-axis positive direction by clamping the end surface to a plate-shaped fixture 14, and provides a loading plate 15 on an end surface 12a of the longitudinal member 12 in the Z-axis positive direction. The structural test is performed by applying a load (load Px in the negative direction of the X axis shown in FIG. 30) to such a test object 1A in a loading device 16 connected to the loading plate 15.

Here, as shown in FIG. 31, coordinates at the outline on the member cross section of the transversal member 11 are measured by photographic measurement (photographic measurement for a space coordinate of a measurement point or a dimension and a shape of the object by analyzing disparity information from a two-dimensional image acquired by capturing a three-dimensional object from a plurality of observation points) using the principle of photogrammetry. Coordinates in the outline on the member cross section of the longitudinal member 12 may also be measured by the same method.

A point on the substantially same cross section is determined as a displacement measurement point on a plurality of cross sections of the transversal member 11. A measurement target 41 for photographic measurement using a material having a high to light is provided at the displacement measurement point, and flash photographing is performed in a camera 40 for photographic measurement. The positional relationship is established between the measurement target 41 and the code target A by providing the code target 42 in a member as a measuring target or a measurement jig (not shown) near the member and applying the code target in a measurement photograph simultaneously with the measurement target 41. In this case, it is possible to improve measurement precision by providing a standard point and a standard scale near the measuring target and using the standard point and the standard scale as a reference point and a standard of a reference length in a measurement space.

In the present embodiment, the coordinates of the point of the member of the test object 1A before a load is applied to the loading plate 15, that is, before the deformation is performed, is measured in the camera 40 for photographic measurement (photographic measurement is performed), and subsequently, the coordinates of the point (corresponding to a deformed point of an arbitrary undeformed point) of the member of the test object 1A in a state in which the load is applied to the loading plate 15 by the loading device 16 and the loading plate is held, that is, after the deformation is performed, are measured. A difference between the measurement coordinates before and after the deformation is performed, and thus, it is possible to extract a three-dimensional displacement of coordinates of a point in the measurement space.

In such a structural test, similarly to the method using the finite element method analysis model according to the first embodiment, as a procedure after the displacement of the coordinates of the point of the test object 1A is extracted, it is possible to analyze the deformation mode of the member by calculating the displacement and the rotation angle as the member cross section in the procedure of the deformation mode analysis flow shown in FIG. 3 and calculating the change amount of the member in the axial direction.

In this case, the displacements of the member of the test object 1A are evaluated through the photographic measurement, and thus, it is possible to easily extract the displacements and the rotation angles as the member cross section having a complicated cross-section shape. Accordingly, it is possible to quantitatively evaluate the deformation mode of the structure in only a testing stage or a previously developed stage.

Third Embodiment

In a third embodiment, when the deformation mode analysis method of the structure described in the first and second embodiments is performed, a method of separating the structure into regions of the respective members and areas of connections for the respective members, calculating a contribution of the deformation for each separated region through analysis, and analyzing the deformation mode of the structure is used. Hereinafter, a specific example will be described.

The third embodiment is an example of a method of analyzing a displacement of a first structure 5A (see FIG. 35) as an evaluating target, which is generated due to a load, by quantitatively evaluating a degree of influence due to the deformation of each member constituting the first structure 5A.

For example, the first structure 5A is a part of the entire structure such as a vehicle (for example, a car) and is formed in a T shape acquired by coupling a longitudinal member 52 to a central portion of a transversal member 51 in a member axial direction. The longitudinal member 52 is configured such that a flange 52a protrudes in a direction perpendicular to the member axial direction at a connection end with the transversal member 51 is connected to a side surface 51a of the transversal member 51. A reference symbol Hc shown in FIG. 35 denotes a height dimension of the longitudinal member 52, and a reference symbol Hs denotes a height dimension of the transversal member 51.

Here, a direction in parallel with the member axial direction of the transversal member 51 is referred to as an X1 direction, a direction in parallel with the member axial direction of the longitudinal member 52 is referred to as a Y1 direction, and a direction perpendicular to a plane including the X1 direction and the Y1 direction is referred to as a Z1 direction.

Figure 36A:
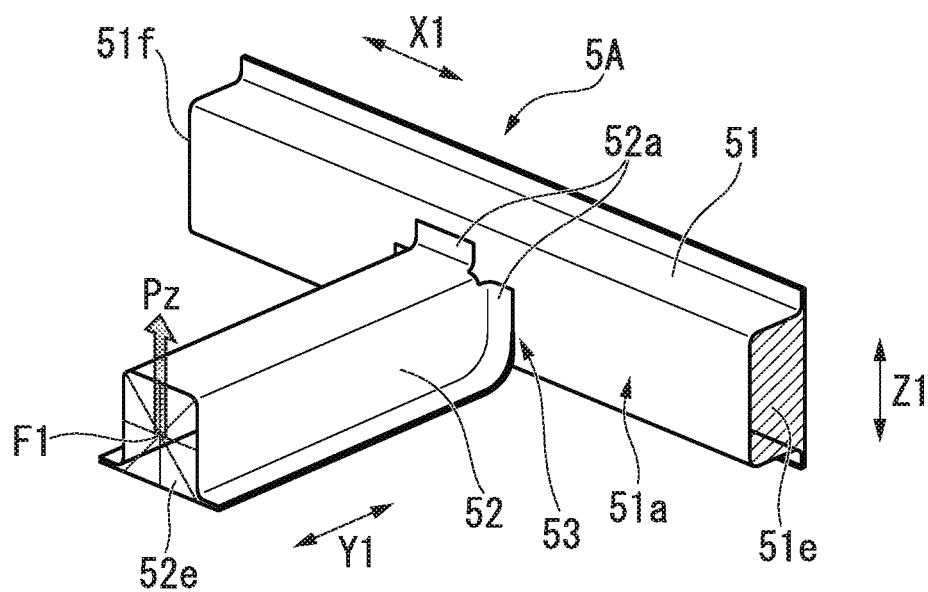
FIG. 36A is a perspective view showing a loading state of the first structure of FIG. 35.
Figure 36B:
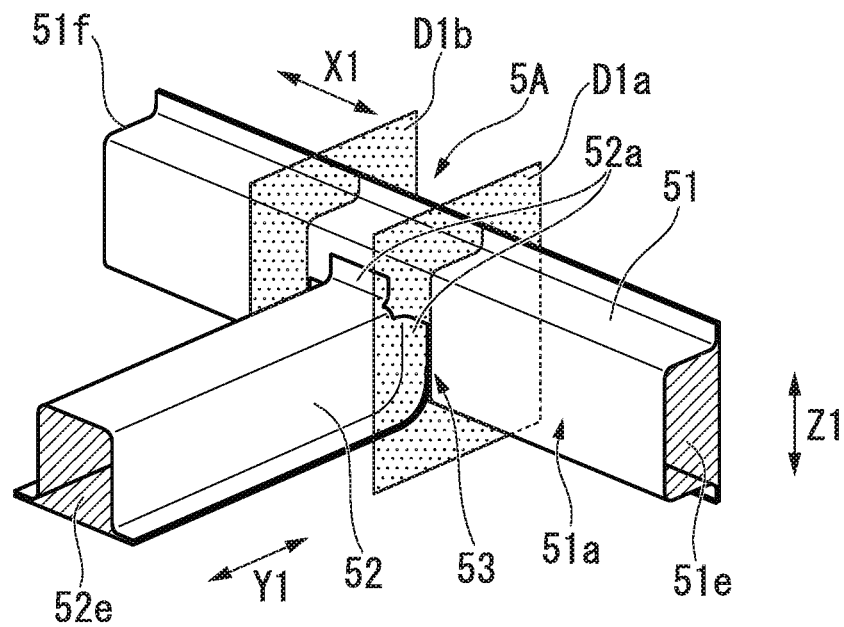
FIG. 36B is a perspective view showing a displacement extraction surface of a transversal member of the first structure of FIG. 35.
Figure 36C:
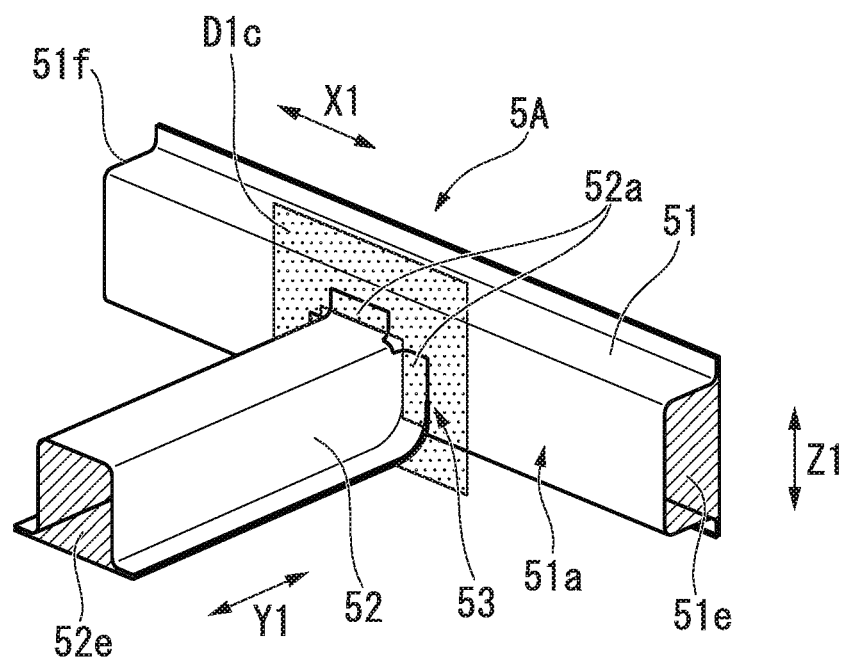
FIG. 36C is a perspective view showing a displacement extraction surface of a longitudinal member of the first structure of FIG. 35.

As shown in FIG. 36A, a contribution of the deformation in a case where end surfaces 51e and 51f of the transversal member 51 of the first structure 5A are fixed and a load Pz is applied to a central point F1 of an end surface 52e of the longitudinal member 52 of the first structure 5A is analyzed. Here, a region of a connection 53 of the transversal member 51 and the longitudinal member 52 of the first structure 5A is determined as a region surrounded by displacement extraction surfaces D1a, D1b, and D1c shown in FIGS. 36B and 36C. A region of the longitudinal member 52 is determined as a region between the displacement extraction surface D1c and the end surface 52e, a region of the transversal member 51 is determined as a region between the displacement extraction surface D1a and the end surface 51e and a region between the displacement extraction surface D1b and the end surface 51f.

If the load Pz is applied to the first structure 5A, the central point F1 of the end surface 52e of the longitudinal member 52 is deformed in a direction of the load Pz, and a displacement in this case is the sum of displacements of the central point F1 due to the deformations of the regions of the transversal member 51, the longitudinal member 52, and the connection 53. Here, if a displacement of the central point F1 generated due to the deformation of the transversal member 51 is US, a displacement of the central point F1 generated due to the deformation of the longitudinal member 52 is UC, a displacement of the central point F1 generated due to the deformation of the connection 53 is UL, a displacement U of the central point F1 is U=UC+US+UL as the sum of the displacements generated in the respective regions.

Figure 37:
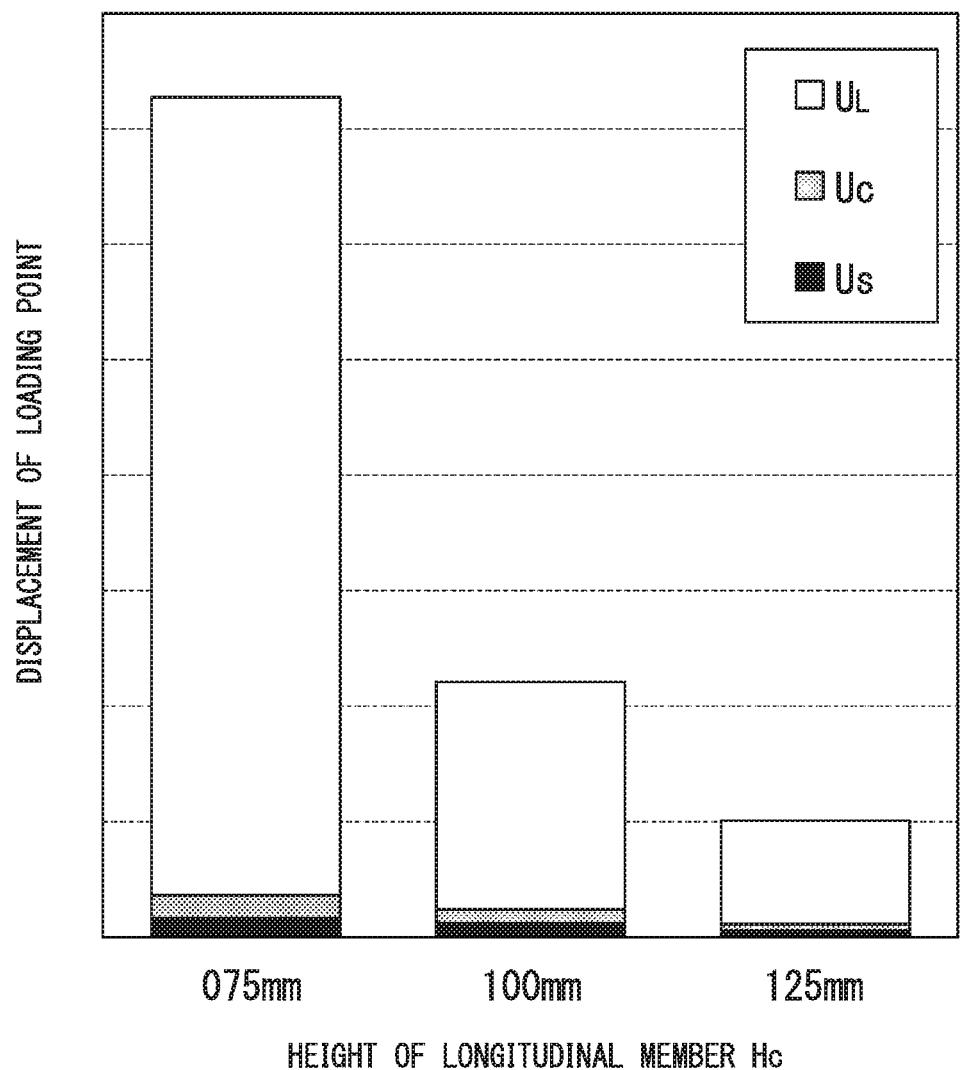
FIG. 37 is a diagram showing a deformation separation result as a result using the load Pz.

The displacements UC, US, and UL may be calculated based on the displacement of the loading point (central point F1), the translational displacements and the rotation angles of the displacement extraction surfaces D1a, D1b, and D1c, and the dimensions of the respective regions. FIG. 37 shows the displacement (displacement) of the loading point (central point F1) when the load Pz is applied in three cases where a height Hs of the transversal member 51 is 125 mm and a height Hc of the longitudinal member 52 is sequentially changed to 75 mm, 100 mm, and 125 mm. It can be checked through this result that a contribution of a local deformation UL of the connection 53 is large in the deformation of the first structure 5A. It can be seen that as the height Hc of the longitudinal member 52 becomes closer to the height Hs of the transversal member 51, the generation of the local deformation UL of the connection 53 is suppressed, and thus, the rigidity of the structure is improved.

As stated above, in the third embodiment, the deformation of the loading point generated in a case where the regions separated into the plurality of members constituting the structure and the elements including the connections of these members are assumed, the deformations of the structure is separated into the deformations for the respective elements, and the respective elements are deformed is calculated. It is possible to acquire a desired specification of the structure by calculating the entire deformation of the first structure 5A as the sum (U=UC+US+UL) of the deformation amounts for the respective separated regions, extracting a reinforcement method of suppressing the deformation of the portion (reinforcement portion) of which the contribution to the deformation of the first structure 5A is large, and reinforcing the structure.

Figure 35:
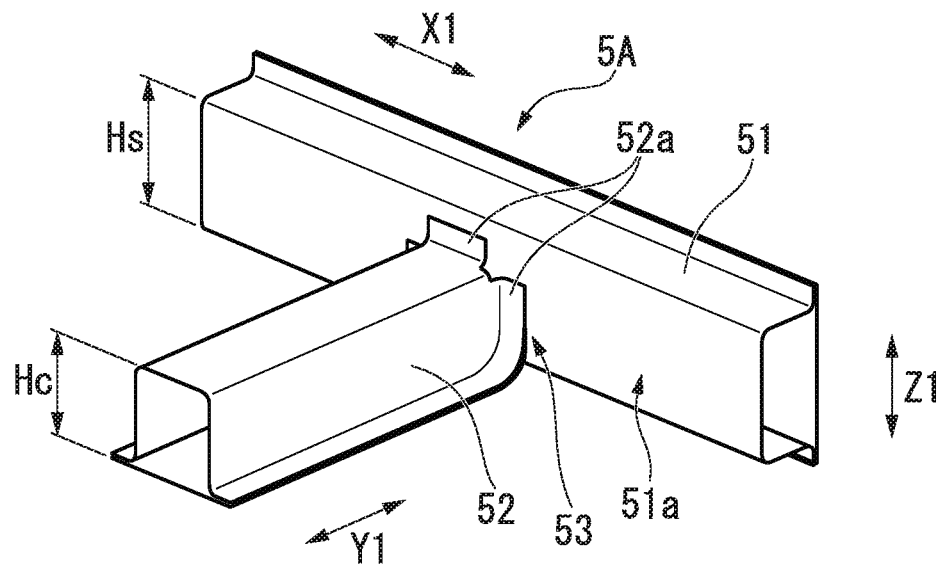
FIG. 35 is a perspective view showing a first structure according to a third embodiment of the present invention.
Figure 38:
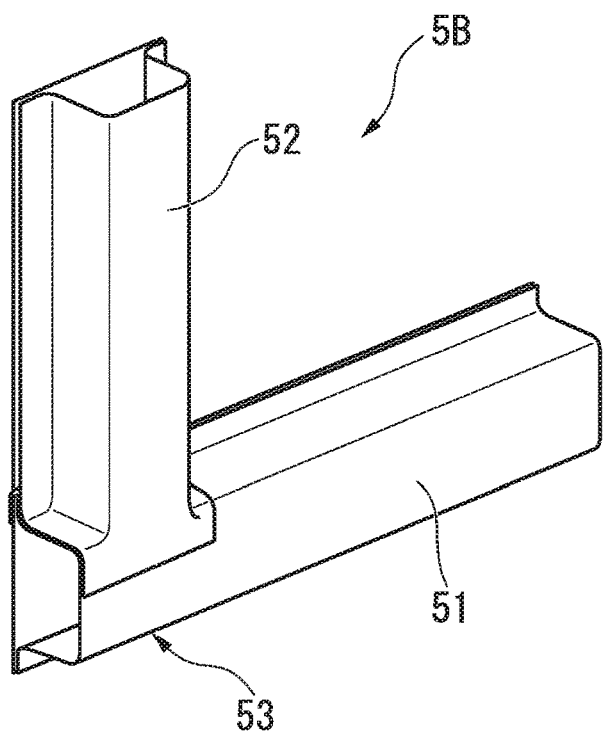
FIG. 38 is a perspective view showing a second structure according to a modification example.
Figure 39:
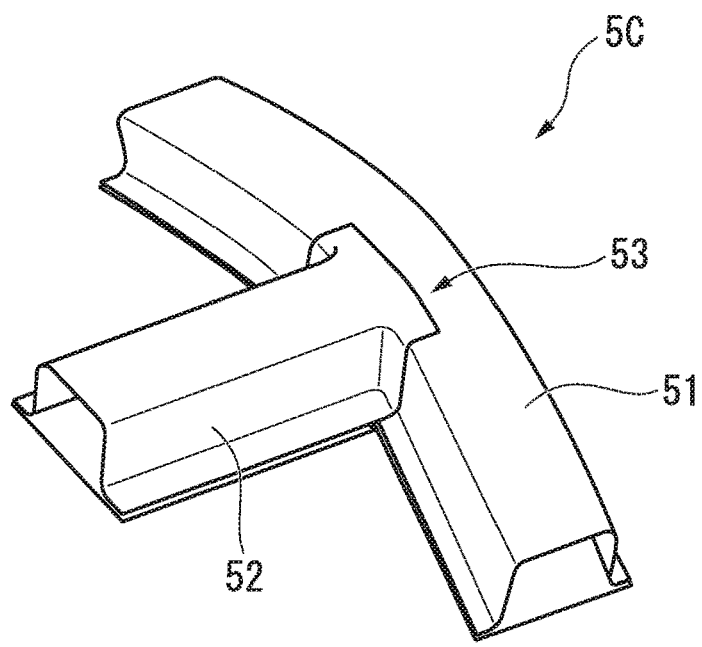
FIG. 39 is a perspective view showing a third structure according to a modification example.
Figure 40:
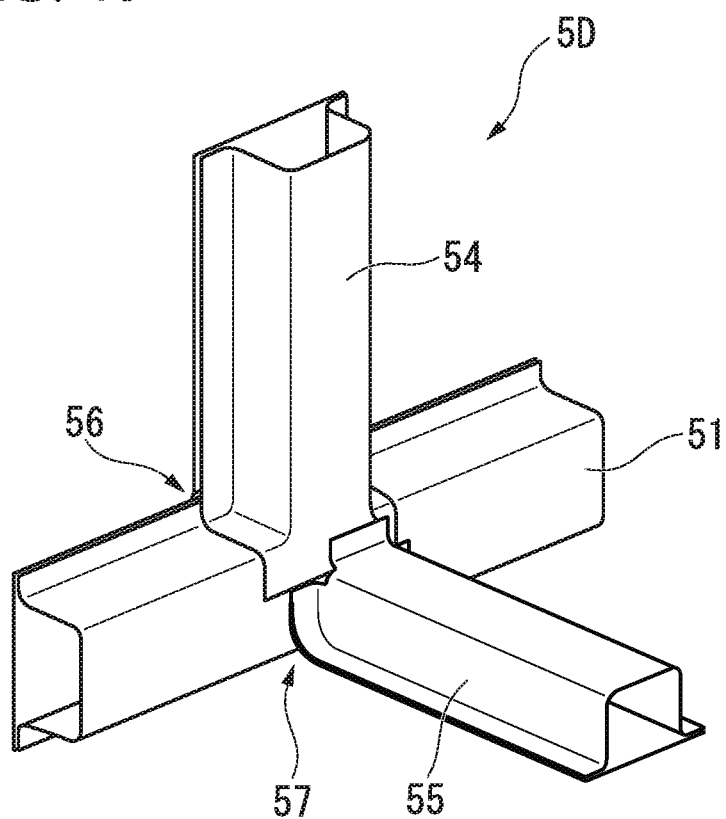
FIG. 40 is a perspective view showing a fourth structure according to a modification example.

It has been described that the third embodiment, the T-shaped first structure 5A shown in FIG. 35 is used as an example of the target of the structure for setting the separated regions, the structure is not limited to the structure having such a shape. For example, even in a case where the structure has a shape such as an L-shaped second structure 5B as shown in FIG. 38, a T-shaped third structure 5C of which the transversal member 51 is curved as shown in FIG. 39, or a cruciform-joint-shaped fourth structure 5D shown in FIG. 40, it is possible to analyze the structure by setting the separated regions. For example, it is possible to separate the structure into the transversal member 51, a first joint 54, a second joint 55, a connection 56 of the transversal member 51 with the first joint 54, and a connection 57 of the transversal member 51 with the second joint 55, as the separated regions in the case of the fourth structure D shown in FIG. 40.

Although the deformation mode analysis method for the structure, the structure reinforcement method using the deformation mode analysis method, the computer program for the deformation mode analysis of the structure, and the recording medium according to the respective embodiments of the present invention have been described, the present invention is not limited to only the respective embodiments, and may be appropriately changed without departing from the gist thereof.

For example, although the deformation mode analysis of the structure 1 (test object 1A) constituted by the member of which the member axis is a straight line and the cross section is a closed cross section has been described in the first embodiment and the second embodiment, it is possible to similarly perform deformation mode analysis on a structure constituted by the member having a curved member axis or an opened cross section.

In addition, it is possible to appropriately replace the constituent elements according to the above-described embodiments with the known constituent elements without departing from the gist of the present invention.

INDUSTRIAL APPLICABILITY

According to the deformation mode analysis method for the structure, the structure reinforcement method using the deformation mode analysis method, the computer program for the deformation mode analysis of the structure, and the recording medium of the present invention, it is possible to analyze a complicated deformation in which the bending or torsion generated in the member constituting the structure is coupled, and it is possible to provide an effective reinforcement method depending on the deformation mode.

BRIEF DESCRIPTION OF THE REFERENCE SYMBOLS 1, 5A, 5B, 5C: STRUCTURE
1A: TEST OBJECT
2: STRUCTURAL ANALYSIS DEVICE
3: INPUT AND OUTPUT DEVICE
10: FINITE ELEMENT METHOD ANALYSIS MODEL
11: TRANSVERSAL MEMBER
11a: FIXATION END
12: LONGITUDINAL MEMBER
12a: TIP END SURFACE
40: CAMERA FOR PHOTOGRAPHIC MEASUREMENT
41: MEASUREMENT TARGET
42: CODE TARGET
F: LOADING POINT

The invention claimed is:

1. A deformation mode analysis method for a member of a structure of analyzing a deformation mode of a member by performing a structural test on a structure including a single member or a plurality of members, the method comprising:
analyzing the deformation mode of the structure by separating the structure into a plurality of regions and calculating deformations for every separated region, the method further comprising:
setting an outline on a member cross section of the member before deformation from a result of the structural test, setting an arbitrary first point in the outline and a second point which is different from the first point and is located on a displacement extraction surface including the member cross section, as displacement extraction points, and extracting coordinates of the first and second points before and after the member is deformed;
calculating vectors using the first point and the second point before and after the member is deformed;
calculating displacements of the first point and the second point before and after the deformation and angles formed by the vectors before and after the deformation;
calculating a translational displacement and a rotation angle of the member cross section from the displacements and the angles; and
calculating change amounts of the translational displacements and change amounts of the rotation angles of the member cross section with respect to a member axial direction of the member.

2. The deformation mode analysis method for a member of a structure according to claim 1,
wherein the vector is a vector acquired by connecting two points in the outline, or a vector acquired by connecting two points including one point in the outline and one point out of the outline within the displacement extraction surface including the member cross section.

3. The deformation mode analysis method for a member of a structure according to claim 1,
wherein a plurality of triangular elements each having two points in the outline and a point out of the outline within a plane including the member cross section, as vertices of the triangular elements are determined on the member cross section,
displacements of the triangular elements are calculated from coordinates of the respective vertices of the triangular elements before and after the deformation, and rotation angles of the triangular elements are calculated from angles formed by the vectors calculated using the respective vertices of the triangular elements for the vectors before and after the deformation, and
translational displacements and rotation angles of the member cross section are calculated as an average of the displacements of the plurality of triangular elements and an average of the rotation angles of the plurality of triangular elements.

4. The deformation mode analysis method for a member of a structure according to claim 3,
wherein the translational displacement and the rotation angle of the member cross section are calculated as averages of values acquired by multiplying a weighting factor depending on an area of the triangular element.

5. The deformation mode analysis method for a member of a structure according to claim 3,
wherein the point out of the outline within the plane including the member cross section is a centroid, a center of gravity, or a shear center on the member cross section.

6. The deformation mode analysis method for a member of a structure according to claim 1,
wherein the translational displacement of the member cross section is calculated from an average of the displacements before and after the deformation, and
the rotation angle of the member cross section is calculated from an average of the angles before and after the deformation.

7. The deformation mode analysis method for a member of a structure according to claim 1,
wherein, when the translational displacement of the member cross section is calculated from an average of the displacements before and after the deformation, a value of at least one displacement deviated from the average is excluded.

8. The deformation mode analysis method for a member of a structure according to claim 1,
wherein, when the rotation angle of the member cross section is calculated based on an average of the angles before and after the member is deformed, a value of at least one angle deviated from the average is excluded.

9. The deformation mode analysis method for a member of a structure according to claim 1,
wherein the translational displacements and the rotation angles of the member cross section are calculated as averages of values acquired by multiplying a weighting factor depending on a length of a vector acquired by connecting two points on the member cross section.

10. The deformation mode analysis method for a member of a structure according to claim 1,
wherein, in the performing of the structural test on the structure and extracting the coordinates of the points on the member cross section before and after the deformation, the translational displacements and the rotation angles of the member are evaluated based on coordinates acquired through photographic measurement.

11. A deformation mode analysis method for a member of a structure of calculating a contribution of a deformation for a region of a member and a connection of the structure or for each region classified as the member or the connection by using the deformation mode analysis method for a member of a structure according to claim 1.

12. A computer-readable non-transitory medium, storing a set of instructions, executable by a processor, to perform a deformation mode analysis method for a member of a structure of analyzing a deformation mode of a member by performing a structural test on a structure including a single member or a plurality of members, the method comprising:

analyzing the deformation mode of the structure by separating the structure into a plurality of regions and calculating deformations for every separated region, the method further comprising:

setting an outline on a member cross section of the member before deformation from a result of the structural test, setting an arbitrary first point in the outline and a second point which is different from the first point and is located on a displacement extraction surface including the member cross section, as displacement extraction points, and extracting coordinates of the first and second points before and after the member is deformed;

calculating vectors using the first point and the second point before and after the member is deformed;

calculating displacements of the first point and the second point before and after the deformation and angles formed by the vectors before and after the deformation;

calculating a translational displacement and a rotation angle of the member cross section from the displacements and the angles; and calculating change amounts of the translational displacements and change amounts of the rotation angles of the member cross section with respect to a member axial direction of the member.

13. A deformation mode analysis method for a member of a structure of analyzing a deformation mode of a member by performing a structural test on a structure including a single member or a plurality of members, the method comprising:

analyzing the deformation mode of the structure by separating the structure into a plurality of regions and calculating deformations for every separated region, the method further comprising:

setting an outline on a member cross section of the member before deformation from a result of the structural test, setting an arbitrary first point in the outline and a second point which is different from the first point and is located on a displacement extraction surface including the member cross section, as displacement extraction points, and extracting coordinates of the first and second points before and after the member is deformed;

calculating vectors in a normal direction with respect to surface elements on the member cross section including the first point and the second point before and after the member is deformed;

calculating displacements of the first point and the second point before and after the deformation and angles formed by the vectors in the normal direction before and after the deformation;

calculating translational displacements and rotation angles of the member cross section from the displacements and the angles; and calculating change amounts of the translational displacements and change amounts of the rotation angles of the member cross section with respect to a member axial direction of the member.

14. The deformation mode analysis method for a member of a structure according to claim 13, wherein a plurality of triangular elements each having two points in the outline, a point out of the outline within a plane including the member cross section, as vertices of the triangular elements are determined on the member cross section, displacements of the triangular elements are calculated from coordinates of the respective vertices of the triangular elements before and after the deformation, and rotation angles of the triangular elements are calculated from angles formed by the vectors in the normal direction with respect to the respective surfaces of the triangular elements for the vectors before and after the deformation, and translational displacements and rotation angles of the member cross section are calculated as an average of the displacements of the plurality of triangular elements and an average of the rotation angles of the plurality of triangular elements.

15. The deformation mode analysis method for a member of a structure according to claim 14, wherein the translational displacement and the rotation angle of the member cross section are calculated as averages of values acquired by multiplying a weighting factor depending on an area of the triangular element.

16. The deformation mode analysis method for a member of a structure according to claim 14, wherein the point out of the outline within the plane including the member cross section is a centroid, a center of gravity, or a shear center on the member cross section.

17. The deformation mode analysis method for a member of a structure according to claim 13, wherein the translational displacement of the member cross section is calculated from an average of the displacements before and after the deformation, and the rotation angle of the member cross section is calculated from an average of the angles before and after the deformation.

18. The deformation mode analysis method for a member of a structure according to claim 13, wherein, when the translational displacement of the member cross section is calculated from an average of the displacements before and after the deformation, a value of at least one displacement deviated from the average is excluded.

19. The deformation mode analysis method for a member of a structure according to claim 13, wherein, when the rotation angle of the member cross section is calculated based on an average of the angles before and after the member is deformed, a value of at least one angle deviated from the average is excluded.

20. The deformation mode analysis method for a member of a structure according to claim 13, wherein the translational displacements and the rotation angles of the member cross section are calculated as averages of values acquired by multiplying a weighting factor depending on a length of a vector acquired by connecting two points on the member cross section.

21. The deformation mode analysis method for a member of a structure according to claim 13, wherein, in the performing of the structural test on the structure and extracting the coordinates of the points on the member cross section before and after the deformation, the translational displacements and the rotation angles of the member are evaluated based on coordinates acquired through photographic measurement.

22. A deformation mode analysis method for a member of a structure of calculating a contribution of a deformation for a region of a member and a connection of the structure or for each region classified as the member or the connection by using the deformation mode analysis method for a member of a structure according to claim 13.

23. A computer-readable non-transitory medium, storing a set of instructions, executable by a processor, to perform a deformation mode analysis method for a member of a structure of analyzing a deformation mode of a member by performing a structural test on a structure including a single member or a plurality of members, the method comprising:

analyzing the deformation mode of the structure by separating the structure into a plurality of regions and calculating deformations for every separated region, the method further comprising:

setting an outline on a member cross section of the member before deformation from a result of the structural test, setting an arbitrary first point in the outline and a second point which is different from the first point and is located on a displacement extraction surface including the member cross section, as displacement extraction points, and extracting coordinates of the first and second points before and after the member is deformed;

calculating vectors in a normal direction with respect to surface elements on the member cross section including the first point and the second point before and after the member is deformed;

calculating displacements of the first point and the second point before and after the deformation and angles formed by the vectors in the normal direction before and after the deformation;

calculating translational displacements and rotation angles of the member cross section from the displacements and the angles; and calculating change amounts of the translational displacements and change amounts of the rotation angles of the member cross section with respect to a member axial direction of the member.

\* \* \* \* \*